(12) United States Patent
Eryurek et al.

(10) Patent No.: US 7,634,384 B2
(45) Date of Patent: Dec. 15, 2009

(54) ASSET OPTIMIZATION REPORTING IN A PROCESS PLANT

(75) Inventors: Evren Eryurek, Minneapolis, MN (US);
Stuart Harris, Minneapolis, MN (US);
Scott N. Hokeness, Lakeville, MN (US);
Todd W. Reeves, Knoxville, TN (US);
Raymond E. Garvey, III, Loudon, TN (US)

(73) Assignees: Fisher-Rosemount Systems, Inc., Austin, TX (US); CSI Technology, Inc., Knoxville, TN (US)

( * ) Notice: Subject to any disclaimer, the term of this patent is extended or adjusted under 35 U.S.C. 154(b) by 74 days.

(21) Appl. No.: 10/390,818

(22) Filed: Mar. 18, 2003

(65) Prior Publication Data

US 2004/0186927 A1     Sep. 23, 2004

(51) Int. Cl.
*G06F 11/30* (2006.01)
*G06F 17/30* (2006.01)
*G06F 19/00* (2006.01)
*G05B 19/418* (2006.01)
*G06F 9/46* (2006.01)

(52) U.S. Cl. ............... 702/182; 700/95; 705/8; 705/9; 705/10

(58) Field of Classification Search ........... 702/182; 705/8–10; 700/95
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |

(Continued)

FOREIGN PATENT DOCUMENTS

EP     1 286 289     2/2003

(Continued)

OTHER PUBLICATIONS

International Search Report for PCT/US2004/007155, completed Aug. 25, 2004.

(Continued)

*Primary Examiner*—Jeffrey R West
*Assistant Examiner*—Janet L Suglo
(74) *Attorney, Agent, or Firm*—Marshall, Gerstein & Borun LLP

(57) ABSTRACT

A process control system uses an asset optimization reporter to collect status information pertaining to the assets of a process plant from various data sources of the plant including, for example, data tools, data collectors, and data generators. This status information is used to generate reports that may be displayed to various users, including maintenance persons, process control persons and business persons. The status information may be used as the basis for further types of status information and/or be categorized in ways that are useful to the user. The reports are generally displayed via a user interface routine that enables users to view the status information and manipulate the display of the report to correspond to the user's preferences, as contained in a user profile. The user interface routine further enables the user to view reports of various types of status information for various devices, loops, units, areas, etc., including status information for the process plant, and manipulate how the status information is displayed, such as with textual, numerical or graphical depictions or any combination thereof.

68 Claims, 18 Drawing Sheets

U.S. PATENT DOCUMENTS

| | | | |
|---|---|---|---|
| 4,734,873 A | 3/1988 | Malloy et al. | |
| 4,763,243 A | 8/1988 | Barlow et al. | |
| 4,764,862 A | 8/1988 | Barlow et al. | |
| 4,885,694 A | 12/1989 | Pray et al. | |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,557,547 A * | 9/1996 | Phaal | 702/127 |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,621,664 A * | 4/1997 | Phaal | 702/57 |
| 5,640,491 A | 6/1997 | Bhat et al. | |
| 5,666,297 A | 9/1997 | Britt et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,715,178 A * | 2/1998 | Scarola et al. | 702/116 |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,809,490 A | 9/1998 | Guiver et al. | |
| 5,817,928 A | 10/1998 | Garvey, III et al. | 73/53.05 |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | 707/104 |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | 395/835 |
| 5,960,441 A | 9/1999 | Bland et al. | |
| 5,984,502 A | 11/1999 | Calder | |
| 5,988,847 A | 11/1999 | McLaughlin et al. | |
| 6,008,985 A | 12/1999 | Lake et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,122,555 A | 9/2000 | Lu | |
| 6,128,279 A | 10/2000 | O'Neil et al. | |
| 6,298,454 B1 | 10/2001 | Schleiss et al. | 714/37 |
| 6,421,571 B1 * | 7/2002 | Spriggs et al. | 700/17 |
| 6,625,511 B1 * | 9/2003 | Suzuki et al. | 700/110 |
| 7,213,232 B1 * | 5/2007 | Knowles | 717/121 |
| 7,359,865 B1 * | 4/2008 | Connor et al. | 705/10 |
| 2002/0007298 A1 * | 1/2002 | Jim et al. | 705/9 |
| 2002/0035499 A1 * | 3/2002 | Germeraad et al. | 705/9 |
| 2002/0123864 A1 | 9/2002 | Eryurek et al. | |
| 2003/0028269 A1 | 2/2003 | Spriggs et al. | |

FOREIGN PATENT DOCUMENTS

| | | |
|---|---|---|
| GB | 2 353 616 | 2/2001 |
| WO | WO-00/49471 | 8/2000 |
| WO | WO-02/33603 | 4/2002 |
| WO | WO-02/071173 | 9/2002 |

OTHER PUBLICATIONS

Written Opinion for PCT/US2004/007155, mailed Sep. 3, 2004.

English Language Translation of First Office Action for corresponding Chinese Application No. 200480007377.4, dated Dec. 14, 2007.

"GE Predictor™ Services: GE Predictor Services Overview," GE Industrial Systems, available at http://www.geindustrial.com/cwdservices?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

LIMS (Lab Information Management System) Technical Description, Product Information for Oil View LIMS Module, (Undated) http://www.compsys.com/marketing/LitCatalog.nsf/lookup/741197FBEBBC252A852569DC006FD245/$FILE/LIMS.doc.

Product Data Sheet—PlantWeb Messenger, Website, 4 pages, Jan. 2003 http://www.easydeltav.com/pd/pds%5Fmessenger.pdf.

"Mini Lab Report", Website, 5 pages, May 14, 2001 http://www.compsys.com/files/sample_minilab_report.pdf.

CSI's Generic Oil Format, V.2.00, Website, 11 pages, Jul. 14, 1999 http://www.compsys.com/files/GENERICc.pdf.

Garvey, R., "Trivector Graphic", Website, 5 pages, Feb. 3, 2003 http://www.compsys.com/enews/knewspro.nsf/v/RGAY-5JES4Z.

Garvey, R., "Wear Rates Impact Maintenance Priorities", Website, 9 pages, Nov. 18, 2002 http://www.compsys.com/enews/knewspro.nsf/v/RGAY-5FVRCE.

Garvey, R., "Oilview® Reports for Managing Oil Analysis", Website, 11 pages, Oct. 21, 2002 http://www.compsys.com/enews/knewspro.nsf/v/RGAY-5DHPUX.

Garvey, R., "Wear Debris Analysis Update", Website, 11 pages, Oct. 7, 2002 http:www.compsys.com/enews/knewspro.nsf/v/RGAY-5DHPUJ.

Garvey, R., "Sample Scheduling", Website, 3 pages, Sep. 20, 2002 http://www.compsys.com/enews/knewspro.nsf/v/RGAY-5DHPMB.

Garvey, R., "PPM by Volume and Size Distribution", Website, 6 pages, Sep. 16, 2002 http://www.compsys.com/enews/knewspro.nsf/v/RGAY-5CRJ7W.

Garvey, R., "Setting Alarm Limits", Website, 4 pages, Aug. 6, 2002 http://www.compsys.com/enews/knewspro.nsf/v/RGAY-5CRJ56.

Garvey, R., "Set Alarm Limits Using Statistics", Website, 2 pages, Jul. 26, 2000 http://www.compsys.com/enews/knewspro.nsf/v/DBRN-4Z7G2K.

Garvey, R., "Reporting with 32-bit OilView Software", Website, 3 pages, Apr. 10, 2000 http://www.compsys.com/enews/knewspro.nsf/v/DDRN-4Z7FZL.

Emerson Process Management—CSI—Products: OilView Wear Debris Analysis Module, Website, 2 pages, © 1996-2001.

Emerson Process Management—CSI—Products: Oil View Minilab Module, Website, 1 page, © 1996-2001.

Emerson Process Management—CSI—Products: OilView LIMS Instrument Communication, Website, 1 page, © 1996-2001.

Emerson Process Management—CSI—Products: Oil View LIMS Module, Website, 2 pages, © 1996-2001.

"Tribology Solutions: Reliability Based Maintenance", 8 pages, © 2002, Website Brochure found at: http://www.compsys.com/files/TribologyBrohiRes.pdf Hayzen, T., "Oil View Laboratory Information Management System 'LIMS'", 27 pages, © 2000, Website Presentation found at: http://www.compsys.com/files/LIMS.ppt Hayzen, T., "Tribology Storybook", 20 pages, (undated), Website Presentation found at: http://www.compsys.com/files/TribologyStoryBookLetter.ppt Hayzen, T., "Magaging Your Oil Analysis Program", 28 pages, (undated), Website Presentation found at: http://www.compsys.com/files/ManagingOilAnalysisProgram.ppt.

U.S. Appl. No. 09/499,445 entitled "Diagnostic Expert in a Process Control System" filed on Feb. 7, 2000.

U.S. Appl. No. 09/852,945 entitled "Remote Analysis of Process Control Plant Data" filed on May 10, 2001.

U.S. Appl. No. 10/085,439 entitled "Creation and Display of Indices Within a Process Plant" filed on Feb. 28, 2002.

U.S. Appl. No. 10/086,159 entitled "Automatic Work Order/Parts Order Generation and Tracking" filed on Feb. 28, 2002.

U.S. Appl. No. 10/123,445 entitled "Web Services-Based Communications for Use With Process Control Systems" filed on Apr. 15, 2002.

* cited by examiner

EXFAN # 1 Asset Details

| Type | 400HP |
|---|---|
| Description | Exhaust Fan #1 |
| Health Index | 1 |
| Recommended Action | Repair as soon as possible |
| Alarm Severity Value | 100 |
| Alarm Severity | CATASTROPHIC |
| Alarm Technology | Periodic Vibration |
| Alarm Analysis Type | Envelope |
| Event Urgency Value | 66 |
| Event Urgency | Significant |
| Event Fault | Imbalance |

Tabs: Asset List | Active Alerts | Historical Events

Tree:
- Plant
  - Asset Database
  - Data Sources
    - RBM1
    - RBM2
      - group
        - Areas
          - A1 - Area 1 (Industry Area)
          - A2 - Area 2 (Vibration Technology)
          - A3 - Area 3 (Motor Technology)
          - A4 - Area 4 (OilView Area)
          - A5 - Area 5 (Infrared Technology)
          - A6 - Area 6 (Ultrasonic Technology)
          - A7 - Area 7 (Alignment Jobs)
          - A8 - Area 8 (Analyze Jobs)
          - A9 - Area 9 (Balance Jobs)
          - A10 - Area 10 (Motor Jobs)
          - A11 - Area 11 (QC Jobs)
          - A12 - Area 12 (Adv Diagnostic Jobs)
          - A13 - Area 13 (Online Technology)
- Related Links

FIG. 8

ASSET OPTIMIZATION REPORTING IN A PROCESS PLANT

FIELD OF TECHNOLOGY

The present invention relates generally to process control systems within process plants and, more particularly, to a system that generates reports specific to a particular user to aid asset optimization in a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant.

However, in the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, autotuners, loop analyzers, neural network systems, etc. Process control operators also receive process variable information from the process via one or more process controllers which provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Because, for the most part, very different applications used to perform the different functions within a plant, e.g., process control operations, maintenance operations and business operations are separated, the different applications used for these different tasks are not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process.

While sharing information would help to alleviate these problems, the information must be presented in a format that is useful to the particular personnel viewing the information. For example, status information regarding a device is made available to the maintenance person and is presented in a report with a format allowing the maintenance person to readily understand, utilize, and make the most efficient use of the information. For example, the report may be designed to allow the maintenance person to alert, locate, identify, and even solve a problem or potential problem with a device. However, this same report may be considered to be not of primary importance, though of interest, to a business person in terms of making business decisions, though the device information is nonetheless important with regards to the overall effect it may have on the plant and, in turn, business decisions made by the business person. That is, the information itself is still useful to the business person, but needs to be presented in an alternative manner that the business person can use. The business person may be unfamiliar of the presentation of data regarding the health of the device that the maintenance person is used to, but would understand the information better if presented in a format the business person is used to. The information may also be useful in terms of generating other information that the business person can use. For example, the health of a device may contribute to the overall health of the plant, which may be of more importance to the business person than just the health of the device.

Likewise, the information about a device may be of importance to the process operator, but only in regards to how it will affect the operational status and optimization of the process control loop. Should there be a potential problem with a device within the process control loop, the process operator may want to view the health of the device because the health of the device impacts the efficiency of the process control loop. In turn, this may affect the process control operator's decisions on how to best operate the process control loop to maintain maximum efficiency while avoiding device failure. However, in the past, because plant functions were separated and information was not shared, reporting methods were limited only to particular users and different persons were also unable to view information available to others, thereby limiting their decision-making abilities and leading to an overall sub-optimal use of the assets within process plants. That is, a business person could only view information in a report regarding the plant but not status information regarding a particular device. Likewise, an operator would operate a loop or device based on efficiency information in a report without knowledge of the device health, whereas a maintenance person could monitor the health of a device via a report, but had no knowledge of how the device was being operated from the same report. In addition, the reports were often static and could not be reconfigured to display new or different information regarding different assets or to display existing information in a customized fashion. Therefore, reports containing necessary information, even if made available to everyone, were not necessarily presented to meet the needs of the user. The reports were often issued separately according to the particular data source being utilized, thereby requiring a user to separately access numerous data sources and view numerous different reports.

SUMMARY

A process control system collects status information pertaining to the assets of a process plant including various entities of the plant at varying levels of hierarchy. The status information pertaining to an entity is received and a report is generated that indicates the status of the entity, whether it be the process plant, an area, a unit, a loop, a device, etc. The report is based on the status information and may also be based on a profile of a user. The user may be a business person, process operator, maintenance person, etc. The report is displayed to the user based on the user profile. A representation of the status information is included in the display of the report. The user profile may include preferences as to the type of status information to be included in the report, how the status information is represented in the report, and what entities the status information relates to, including switching between the various types of status information, the various entities, etc. Alternatively, different types of status information and/or status information of various entities may be displayed concurrently. Different types of status information may be utilized to generate further types of status information to be displayed in the report. The user profile may also include default parameters such that the report is based on default parameters, and/or information about the user's responsibilities within the process plant, such that the report is generated based on the user's responsibilities. Dynamic and static status information may also be included in the report, where static status information is always displayed regardless of the user preference and dynamic status information is displayed based on the user preferences. Status information may also be received, categorized and displayed according to its categorization.

BRIEF DESCRIPTION OF THE DRAWINGS

FIG. 8 is an exemplary graphical display that may be provided by a graphical user interface to enable a user to view detailed alert information;

DESCRIPTION OF THE PREFERRED EMBODIMENTS

Figure 1:
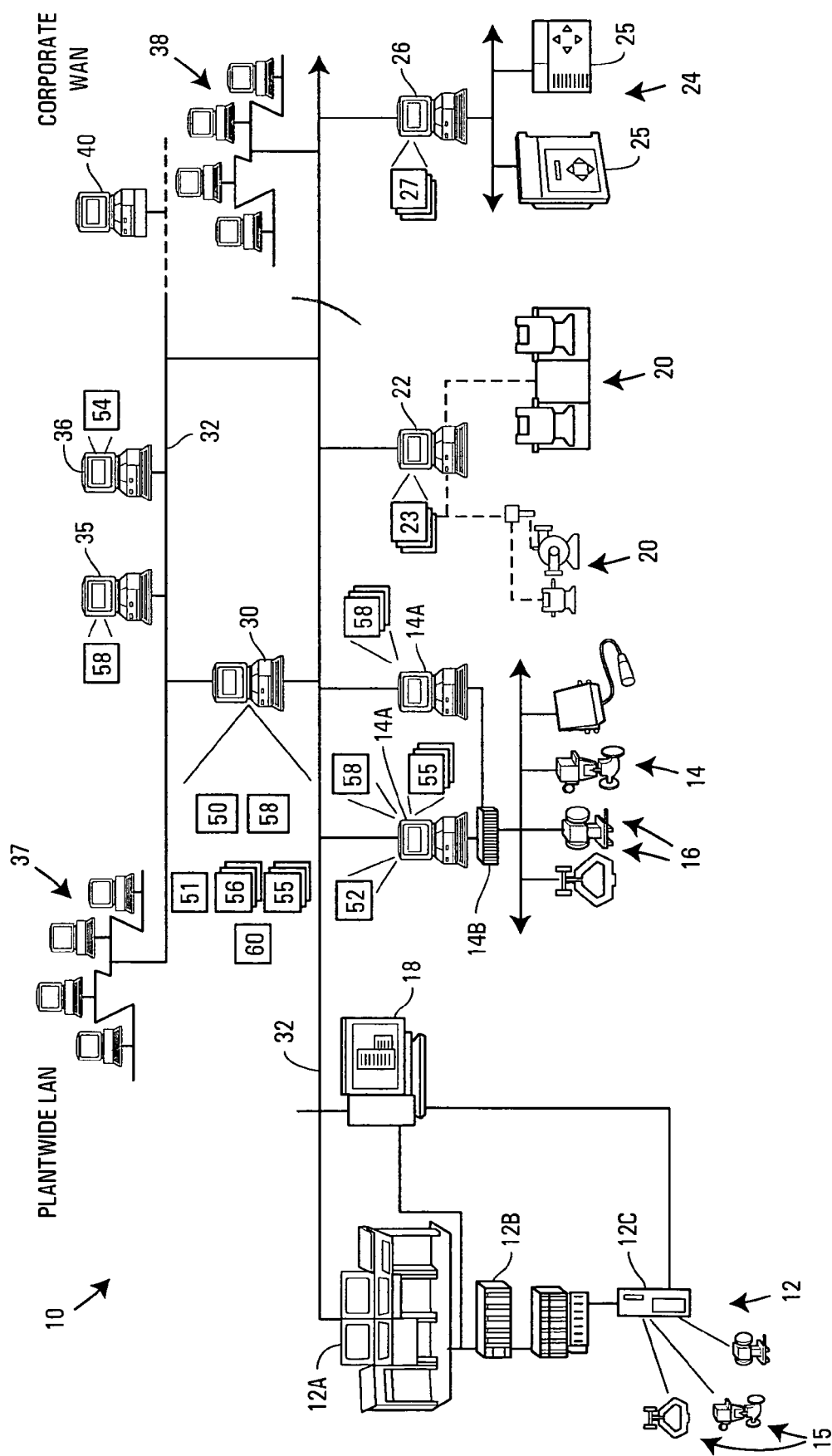
FIG. 1 is a block diagram of a process plant having an asset optimization reporter configured to receive status information and generate a report in accordance with a user profile.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSI Systems of Knoxville, Tenn. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications.

As illustrated in FIG. 1, the computer 30 is also connected via the same or a different network bus 32 to business system computers and maintenance planning computers 35 and 36, which may execute, for example, enterprise resource planning (ERP), material resource planning (MRP), computer maintenance management systems (CMMS), accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

In one embodiment, the communications over the bus 32 occur using the XML/XSL protocol. Here, data from each of the computers 12A, 18, 14A, 22, 26, 35, 36, etc. is wrapped in an XML/XSL wrapper and is sent to an XML/XSL data server which may be located in, for example, the computer 30. Because XML/XSL is a descriptive language, the server can process any type of data. At the server, if necessary, the data is encapsulated with a new XML/XSL wrapper, i.e., this data is mapped from one XML/XSL schema to one or more other XML/XSL schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. Importantly, the asset utilization expert 50 operates as a data and information clearinghouse in the process plant 10 and is able to coordinate the distribution of data or information from one functional area, such as the maintenance area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process plant 10.

In particular, the asset utilization expert 50 may include or execute index generation software 51 that creates indices associated with devices, like process control and instrumentation devices, power generation devices, rotating equipment, units, areas, etc, or that are associated with process control entities, like loops, etc. within the plant 10. These indices can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired. In one embodiment, the control expert 52 may be, for example, the control expert described in U.S. patent application Ser. Nos. 09/256,585 and 09/499,445 identified above.

Additionally, the asset utilization expert 50 can send information to one or more optimizers 55 within the plant 10. For example, a control optimizer 55 can be located in the computer 14A and can run one or more control optimization routines 55A, 55B, etc. Additionally or alternatively, optimizer routines 55 could be stored in and executed by the computer 30 or any other computer, and the data necessary therefore could be sent by the asset utilization expert 50. If desired, the plant 10 may also include models 56 that model certain aspects of the plant 10 and these models 56 can be executed by the asset utilization expert 50 or a control or other expert such as the control expert 52 to perform modeling functions, the purpose of which is described in greater detail in U.S. patent application Ser. No. 10/085,439 entitled "Creation and Display of Indices in a Process Plant," which was filed on Feb. 28, 2002, which is expressly incorporated by reference herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those created by and sold by MDC Technology located in Teeside, England or may be any other desired types of models.

The computer 30 may further store and execute an asset optimization reporter 60. Generally speaking, the asset optimization reporter 60 receives status information from data sources, including the asset utilization expert 50, data tools, data collectors, data generators, etc., and generates a report for a user. A report is generated to display the status information, or a depiction representing the status information, to the user in accordance with a user profile. The report may be presented by one or more user interface routines 58 and tailored to the user's preferences as contained in the user profile. The user profile may also contain information about the user, such as the user's responsibilities within the plant, to determine what status information the user must view, must not view and may optionally view. For example, a maintenance person may generally be responsible for monitoring the health of a device. In addition, the maintenance person may be interested in how the device is being operated by a process operator. The maintenance person's responsibilities and interest may be reflected in the user profile. When a maintenance report is generated by the asset optimization reporter 60, the user profile of the maintenance person is read and a report is generated that contains the status information regarding the health of the device, regardless of the maintenance person's preferences. The report may also contain status information regarding the performance and productivity of the device, which is an optional type of status information available to the maintenance person that the maintenance person has indicated a preference for, as reflected in the user profile. However, the user profile may also contain restrictions on what the maintenance report may contain. For example, the maintenance person may be restricted from seeing status information about the financial health of the process plant.

Also, generally speaking, the one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset optimization reporter 60 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs. Of course, the user interface routine 58 may provide any user access to and enable the user to change preferences or other variables used in any or all functional areas of the plant 10.

Figure 2:
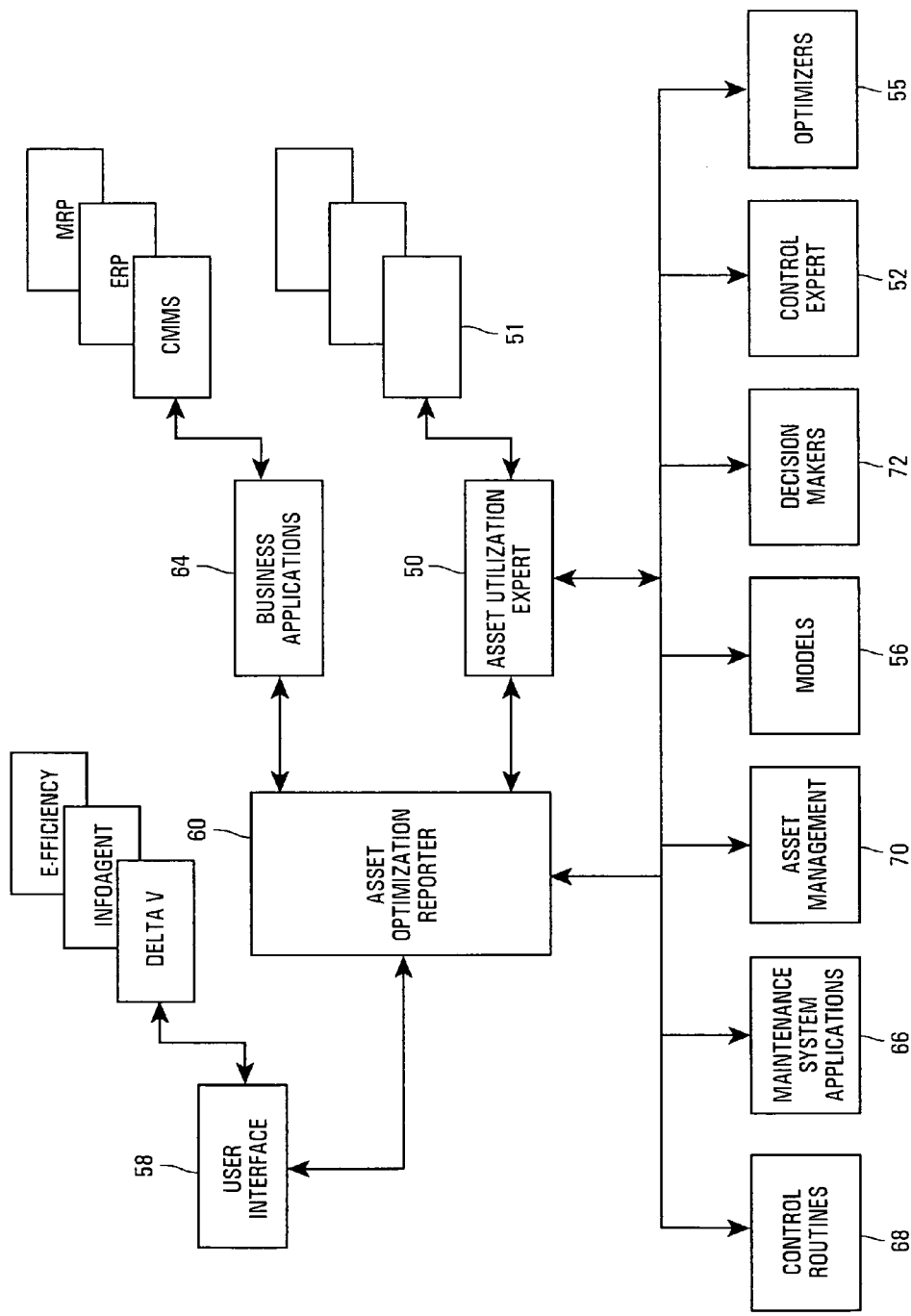
FIG. 2 is a data and information flow diagram with respect to the asset optimization reporter within the plant of FIG. 1.

Referring now to FIG. 2, a data flow diagram illustrating some of the data flow between an asset optimization reporter 60 and other data tools or data sources within the process plant 10 is provided. In one embodiment, an asset optimization reporter 60 receives information from information sources which may run various routines and applications for providing status information regarding devices, loops, units, areas, etc. within a process plant. The asset optimization reporter 60 may be incorporated with a central data collecting, sharing and distribution application, such as the asset utilization expert 50 described above which receives much of the status information from the various data tools and data sources, or provided as a separate application. The asset optimization reporter 60 may be centrally located at a particular server, which may be maintained locally at the plant 10 or remotely from the plant 10. Alternatively, the asset optimization reporter 60 may be distributed among several computers such as business system computers 35, maintenance computers 18, 22, maintenance planning computers 36. Furthermore, the asset optimization reporter 60 may be a network application available over the Internet and/or the plantwide LAN 37 and available to various personnel through user interfaces 12A, 14A, 58.

As mentioned above, the asset optimization reporter 60 receives status information from various data sources, which may include data collectors, data generators or data tools including index generation routines 51, the control expert 52, optimizers 55, model generation routines 56, control routines 62, business applications 64, maintenance system applications 66, control routines 68, asset managers 70, decision makers 72, etc. In one embodiment, the asset optimization reporter 60 may receive information from the asset utilization expert 50 described above, and which is described further in U.S. patent application Ser. No. 10/085,439 referred to above. This information may include indices related to the health, performance, utilization and variability of a particular device, loop, unit, area, etc. This data can take on any desired form based on how the data is generated or used by other functional systems. Still further, this data may be sent to the asset optimization reporter 60 using any desired or appropriate data communication protocol and communication hardware, such as the XML/XSL protocol discussed above. Generally speaking, however, the plant 10 will be configured so that the asset optimization reporter 60 automatically receives specific kinds of data from one or more of the data sources.

In addition to receiving indices from the asset utilization expert 50, optimization information from optimizers 55, such as the RTO+ real time optimization routine which is provided by MDC, Inc., may be received by the asset optimization reporter 60. In one embodiment, the RTO+ real time optimization routine may be used as a real time optimizer and may be executed at various or periodic times during operation of the plant 10. The RTO+ real time optimization routine is described in greater detail in U.S. patent application Ser. No. 10/085,439 mentioned above. The RTO+ optimization routine first executes an input phase during which the routine checks to determine whether the variables that were previously indicated as being variables which could be manipulated by the optimizer to perform optimization, such as set points or other inputs of various devices, units, etc., can actually be manipulated at the current time. This information may be available to the optimizer from the asset utilization expert 50 which obtains this information from the process control system and stores this information within any desired database. Thus, during the input phase, the optimizer actually determines, based on the data provided to it from the asset utilization expert 50, whether each of the possible manipulated inputs is still available to be changed. The real time optimizer may also determine if the variables that were supposed to change during the last run of the optimizer were actually changed to and reached the suggested or calculated values from the last run of the optimizer. Detecting a failure of a variable to reach a value which it should have theoretically reached may also cause the optimizer to report to an operator that there may be a problem within the system that needs to be addressed. Next, the optimizer performs a quick execution of each of the individual component models that make up the entire model using, for example, the actual inputs and outputs measured from the plant 10. The calculated outputs of each component model are then reviewed to see if there is any problem with any particular component model that will prevent the entire model from running accurately. Assuming that each of the component models can be executed, the optimizer may look for discrepancies in the models which may effect the ability of the optimizer to optimize.

In the next phase, known generally as the optimization phase, the optimizer runs the individual models in a predetermined order using the outputs from one component model as inputs to one or more of the other component models making up the entire model. Using the entire model, the constraints provided by the user and the new constraints determined by the input phase, as well as the optimization criteria, the optimizer determines the changes to be made to the input or manipulated variables which have been detected as currently being capable of manipulation which will optimize the plant over the time window in which the optimizer runs. The use of optimization software is well known and any desired optimization software for this purpose could be used. It will be seen that the determination of the optimization criteria, which is typically performed by a business person or a business application, is very critical to the operation of the optimizer and thus, ultimately, to the operation of the plant 10. As a result, the asset utilization expert 50 may provide the business person, via the user interface routines 58, a systematic set of choices of what the optimization criteria will be at any particular time and provides the choices made by the operator or any other user to the optimization routine. In fact, there are many optimization variables that can be selected and the choice of these different criteria may be provided to the operator or business person via the user interface to allow the operator or business person to choose different optimization criteria in any desired manner.

Next, the optimization routine enters an output phase in which implementation of the results of the optimizer may be accomplished. In particular, after computing the suggested changes to the manipulated variables, the optimizer may determine if the manipulated variables or inputs to be changed are still available. If all of the manipulated variables to be changed can still be changed, the suggested changes may be provided to an operator via, for example, the user interface (e.g., a graphical user interface). The operator may be able to simply press a button and have the changes to the manipulated variables initiated or downloaded to the process control routine automatically, such as changing set points, etc. in a matter determined by the optimizer. In another embodiment or in later stages of operation, for example, when the process is running properly, the optimizer may automatically implement the suggested changes if the operator does not prevent the instantiation of the changes within a particular time window. Thus, the output of the optimizer may be used every time the optimizer executes unless the operator intervenes to prevent the changes from the optimizer from being used. As part of this operation, one or more of the user interface routines 58 may provide a screen to the operator indicating the suggested changes to be made and a button or bar which the operator uses to install the changes or to prevent the changes from being installed. If, in one embodiment, the user pushes a button to install the changes, all of the changes are sent to the appropriate controllers where they are checked for limits and then implemented.

While the use of a closed loop, real time optimizer has been discussed above, other types of optimizers 55 which use the same or different component models could also be executed by the asset utilization expert 50 in conjunction with or separately from the real time optimizer. For example, a wideband optimizer may be used to look at or determine where the final optimal operating point of a process may ultimately be, even though the real time optimizer may not be able to drive the plant 10 to that point for some time. This wideband optimizer may enable the business person to make long term predictions about the plant 10 or may enable the operator to determine if the operation of the plant 10 is headed toward a desirable region. If the wideband optimizer determines that the ultimately achievable optimization point is still not acceptable, the operator may decide to change the configuration or other operating parameters of the plant 10.

Other optimizers, such as selection optimizers, may determine whether changes in the process configuration that need to be performed by the operator or maintenance person could better optimize the process. For example, in some cases, a selection optimizer may recognize that certain units or other manipulated inputs that are supposed to be available are no longer available for some reason. The selection optimizer runs one or more optimization tests assuming that one or more of these devices, units, etc. are available, to determine how much better the plant 10 would operate if these entities were put back into operation. This optimizer may, for example, tell the operator or business person how much more money the plant 10 could make by getting certain units or devices online, or could tell the operator or business person which devices or units to focus on getting back into operation first. Such a selection optimizer may also try to optimize by turning particular pumps or valves on or off, by replacing other devices that are running in sub-optimal modes, etc. to determine which critical changes to the process or to the assets thereof could be made to make the process more profitable or optimal. The selection optimizer might use inputs from the operator or business person and/or might use other branch and bound techniques which are common in data processing or data mining routines to select the way in which to adjust the optimization variables. Other selection techniques could also be used, such as providing the selection optimizer with a series of rules to apply in a particular order to determine how to change the process or to determine which changes to the process, if implemented, would provide improvements or the most improvement to the plant 10.

Controllers and control routines 68, such as DeltaV™ described above, may also provide control information to the asset optimization reporter 60, including operating equipment effectiveness, alarms, alerts, production analyses, cost analyses (e.g., cost of fixing, cost of running the device until failure), efficiency, etc. The AMS application, or other maintenance system applications 66, may provided maintenance information, such as the health of a device, maintenance status, downtime analyses (e.g., costs of downtime, cause of downtime, etc.), calibration information, cost analysis, work orders, etc. A work order/parts order generation routine 54 is described in further detail in U.S. patent application Ser. No. 10/086,159 entitled "Automatic Work Order/Parts Order Generation and Tracking" the content of which is expressly incorporated by reference herein. RBMware™ or other known asset management applications 70 provide monitoring, diagnostic and optimization information regarding various equipment, including rotating equipment 20. Information from running mathematical software models 56, as provided by MDC Technology or other model generation applications, are further provided to the asset optimization reporter 60 and may provide modeled status information relating to some or all of the equipment within the process plant 10, including modeled information relating to device models, loops models, unit models, area models, etc. The data from the models 56 may be used or provide predictive control or real time optimal control within the plant 10, including predictive maintenance alerts, predictive maintenance quality assurance, etc. Further, the data generated by the models may be used to generate indices to be used by other applications, such as business and process control applications. Examples of models are described in further detail in U.S. patent application Ser. No. 10/085,439, referred to above. Business applications 64, such as enterprise resource planning (ERP) tools, material resource planning (MRP) tools, computer maintenance management systems (CMMS) or other business applications, may provide business information including key performance indicators (KPIs), economics information, plant yield, stock information, production planning, material resource planning, etc., and engage in business-to-business applications to communicate parts orders, work orders, supply orders, etc. KPIs may include anything from economic indicators, such as profit margins (e.g., profit made per sale), capitol turnover rate (sales per capitol employed) profitability (e.g., profit per capitol investment, profit margin times capitol turnover rate), to asset specific indicators, such as operating equipment effectiveness (OEE), described further below, and supporting metrics. KPIs may further include status information relating to maintenance and operational functions, and is not solely limited to business information.

Each of the above described data sources may provide the information directly to the asset optimization reporter 60 and/or via another application. For example, optimizers 55, control routines 68, control experts 52, business applications 64, maintenance system applications 66, asset managers 70 etc. may provide status information to both the asset optimization reporter 60 and to the asset utilization expert 50 to generate further status information, such as indices, or to execute models 56. The status information from the asset utilization expert 50 would then be provided to the asset optimization reporter 60. In other words, status information may be shared among the various data sources (e.g. tools, applications, etc.) within the process plant 10 in order to generate further status information, though all of the status information may be made available to the asset optimization reporter 60.

As mentioned generally thus far, a plant 10 is comprised hierarchically related entities within the plant 10, such as areas, units, loops, devices, etc., where the plant 10 may be considered an entity in and of itself. The hierarchical arrangement may be arranged where the plant 10 includes various areas, which in turn include various units, that in turn include various loops and devices. Each of these entities are generally interrelated and interconnected within the process plant 10. For example, areas may include devices interconnected with units, loops, etc. In this example hierarchy, lower level entities, such as devices, may be interconnected to form higher level entities, such as units, which in turn may be interconnected to form yet higher level entities such as areas, and so on.

One or more coordinated user interface routines 58 may communicate with the asset optimization reporter 60, as well as any other applications within the plant 10 to provide help and visualization to operators, maintenance persons, business persons, etc. regarding any level within the process plant 10. The operators and other users may use the coordinated user interface routines 58 to perform or to implement predictive control, change settings of the plant 10, view help within the plant 10, or perform any other activities related to the information provided by the data sources. The user interface routines 58 may include an operator guidance tool that receives information from the control expert 52 as well as information related to the indices, which can be used by an operator or other user to help perform many functions such as viewing the status of a process or devices within the process, to guide the predictive control expert 52 or to perform predictive or optimized control. Still further, the user interface routines 58 may be used to view data or to obtain data from any of the data sources in the other parts of the process plant 10 via, for example, the asset utilization expert 50. For example, managers may want to know what is happening in the process or may need high level information related to the process plant 10 to make strategic plans. Operators, on the other hand, may want to know what is happening with the health of a device within the loop or area that the operator is monitoring and operating. Maintenance personnel, in turn, may be interested in how hard an operator is utilizing a device in order to alert that operator to potential problems with the device due to the operator's use. The pooling of status information at the asset optimization reporter 60 described above, provides a centralized source for reporting on the various entities within the process plant 10 to each of the various personnel rather than requiring a user to access each particular data source separately. It will be understood that the asset optimization reporter 60, via a user interface routine 58, can report on one or more entities using one of the monitoring techniques described above and can report status information of these entities to any desired persons, such as to a maintenance person, a business person, a process operator, etc., thereby eliminating the need for separate reports for each entity, data source, etc.

Some examples of existing user interface routines 58 include E-fficiency™ sold by Emerson Process Management of Austin, Tex. which may be used to report equipment performance information. E-fficiency™ is generally a web-based application that allows users to monitor equipment performance from remote locations. For example, a remote monitoring application could provide a user with access to optimizers and other data sources, including the ability to execute various data tools such as process control tools, process monitoring tools, equipment or device monitoring tools, index generation tools, worked order generations tools, business or other tools or applications. The results from the data sources can then be sent back to the remote location as plots, charts, suggested actions, indices, or any other results capable of being provided. Remote monitoring examples are described further in U.S. patent application Ser. No. 09/852, 945 entitled "Remote Analysis of Process Control Plant Data," which was filed on May 10, 2001 and which is hereby expressly incorporated by reference herein. However, other web-based monitoring and reporting applications may also be utilized. Additional interface routines 58 includes DeltaV™ which may be used to report control information. Information regarding rotating equipment may be reported via a user interface as described in U.S. Pat. No. 5,817,928, which is hereby expressly incorporate by reference herein. A variation of this user interface is further applicable beyond rotating equipment, as described further below. Further examples of user interface routines 58 are described in U.S. patent application Ser. No. 10/085,439 mentioned above. However, other examples of a user interface routine 58, including the user interface routine 58 describe below, may be used alternatively or in conjunction with the user interface routines 58 described thus far. The choice or format of user interface routine 58 may be dependent on the type of status information being reported or the particular user viewing the status information.

Generally, the user interface routines 58 provide a graphical user interface (GUI) that is integrated with the asset optimization reporter 60 to facilitate a user's interaction with the various capabilities provided by the different data sources. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system. For example, the user interface routine 58 and GUI may be incorporated as part of a web-based software routine that permits a user to view reports via a network connection, such as over the Plantwide LAN 37, the Internet, or other communications system, thereby allowing a user to view a report on a device, loop, unit, area, etc. remotely from where that device, loop, unit, area, etc. is located or even remotely from the process plant 10. For example, reports, or summaries thereof, may be sent to phones, pagers, electronic mail, etc. This may be particularly useful if the report is time critical (e.g., a device failure alert). An example of a method and system that could permit a user to view reports via a communications system to a pager, cellular phone, personal digital assistant, email address, laptop computer, desktop computer, or any other type of device or hardware platform may be found in U.S. patent application Ser. No. 10/123,445 entitled "Web Services-Based Communications For Use With Process Control Systems," which was filed on Apr. 15, 2002, and which is expressly incorporated herein by reference.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the above data sources may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the above data sources.

For example, the GUI provides intuitive graphical depictions or displays of process control areas, units, loops, devices, etc. Each of these graphical displays may include numerical, textual and graphical displays of status information regarding any entity within the process plant 10. For example, a display depicting a process control area may provide corresponding status information of that area (i.e., a particular portion of the process control system at a particular level of the equipment hierarchy). On the other hand, a display depicting a loop may provide status information associated with that particular loop. In any event, a user may use the status information shown within any view, page or display to quickly assess whether a problem exists within any of the devices, loops, etc. depicted within that display.

Additionally, the GUI described herein may automatically, or may in response to a request by a user, provide status information to the user regarding any entity within the process plant 10. However, depending on the type of information or the security clearance of the particular user, restrictions may be imposed on the basis of the type of status information or on the basis of the particular entity or level. For example, a maintenance person may be restricted to status information regarding the device the maintenance person is responsible for, in addition to status information that may have an immediate or proximate effect on the device, such as information regarding the efficiency and utilization of the device or of the loop that the device is a part of. On the other hand, the maintenance person may be restricted from viewing information related to the efficiency of the process plant 10 as a whole or from viewing sensitive business information. In other cases, such as with the manager of the process plant 10, all status information regarding any entity or level of the process plant 10 may be made available to the user.

Figure 3:
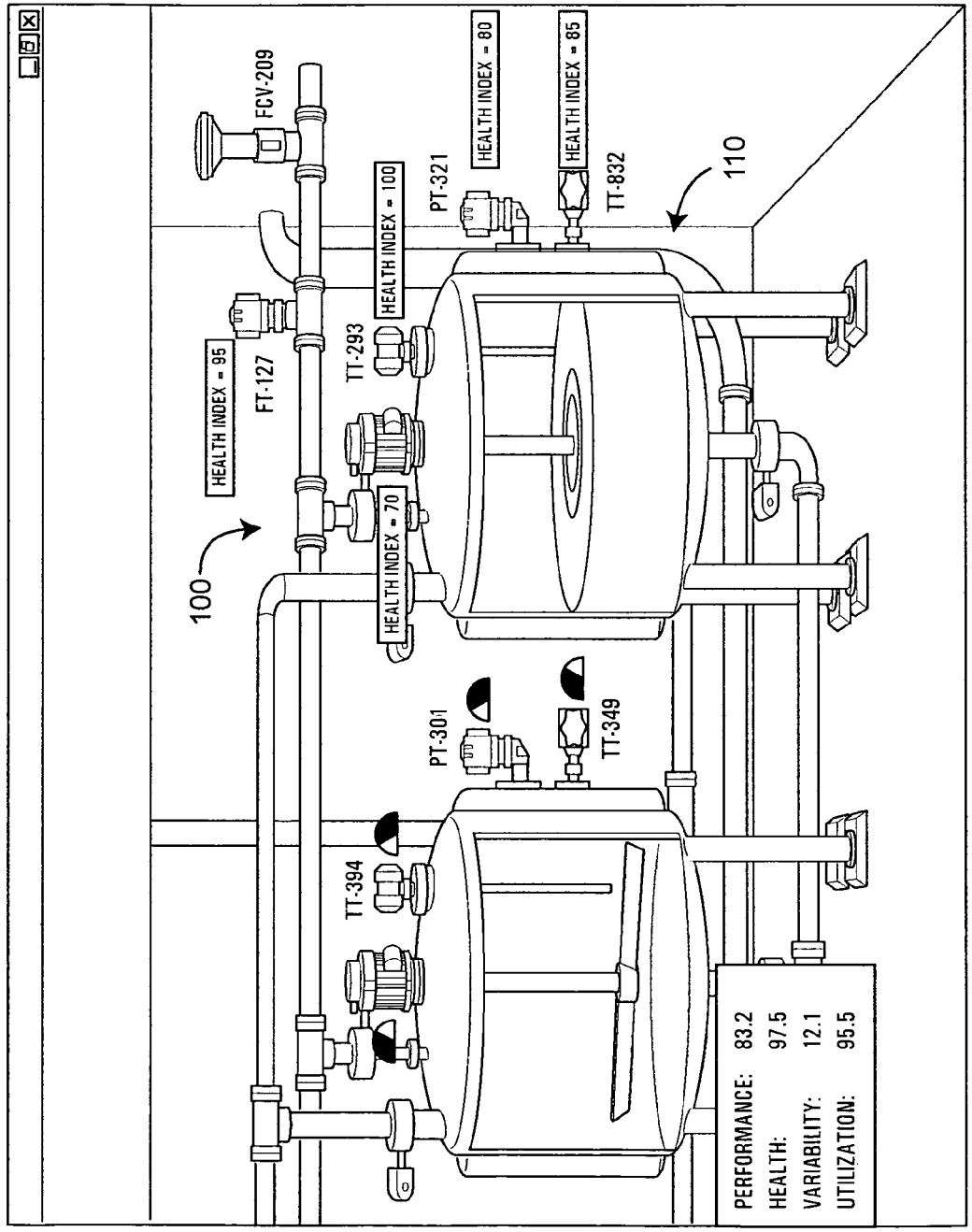
FIG. 3 is an exemplary graphical display that may be provided by a graphical user interface to enable a user to view status information.

FIG. 3 is an exemplary graphical display that may be provided by the GUI to report status information to a user and enable a user to quickly analyze the operational status and performance of a process area within the plant 10. As shown in FIG. 3, the GUI may graphically depict the physical equipment (and the interconnections therebetween) within a process area 100. Of course, it should be recognized that although a process area is depicted within the GUI display, any other portion of the plant 10 such as, for example, a unit, sub unit, loop, device, etc. may be shown instead to achieve the same or similar results. In any event, the process area 100 is depicted as having a pair of tanks, a plurality of temperature transmitters, pressure transmitters, flow transmitters, etc. and pipes, all of which may be interconnected as shown in FIG. 3. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, status information, here shown as one or more index values (performance, health, variability, utilization), may be displayed for one or more of the devices shown within the area 100. By way of example only, health index values for several of the devices that are connected to a tank 110 within the area 100 are displayed. However, more or fewer health index values could be displayed if desired. Additionally, different status information may be displayed for any of the devices that appear within the area 100 as desired. As can be appreciated from the display shown in FIG. 3, a user can quickly ascertain whether an area is performing properly and will continue to perform properly. Further, a user can also quickly identify those devices, units, sub units, etc. that may need attention and/or which may be causing a particular problem.

It will also be understood that a user may view successively lower and lower entities within a plant and be provided status information about each of these different entities or views. Thus, for example, a user may look at a view of the plant and see status information for the plant. The user may then focus on one area, such as by selecting one of the areas within the plant view, and see the status information associated with that area. A user may use a mouse to click on the area (or other entity being viewed) or the associated alphanumeric identifier or, alternatively, may enter the identifier via a keyboard, to request a new window or a pop-up window to display status information for that area. Similarly, by clicking on units within the displayed area, the status information for different units may be viewed. Likewise, status information for loops, sub units, devices etc. may then be viewed by focusing in on these different entities from a view of an entity in which these lower level entities are located. In this manner, a user can quickly find the cause of a problem or potential problem at any point or level of the plant. Still further, the GUI may also provide textual messages within the graphical display shown in FIG. 3 or in some other display or page that indicate to the user current or potential problems, which may be related to the displayed status information or changes thereof. These textual messages may identify possible solutions to the problems which have been identified.

Figure 4:
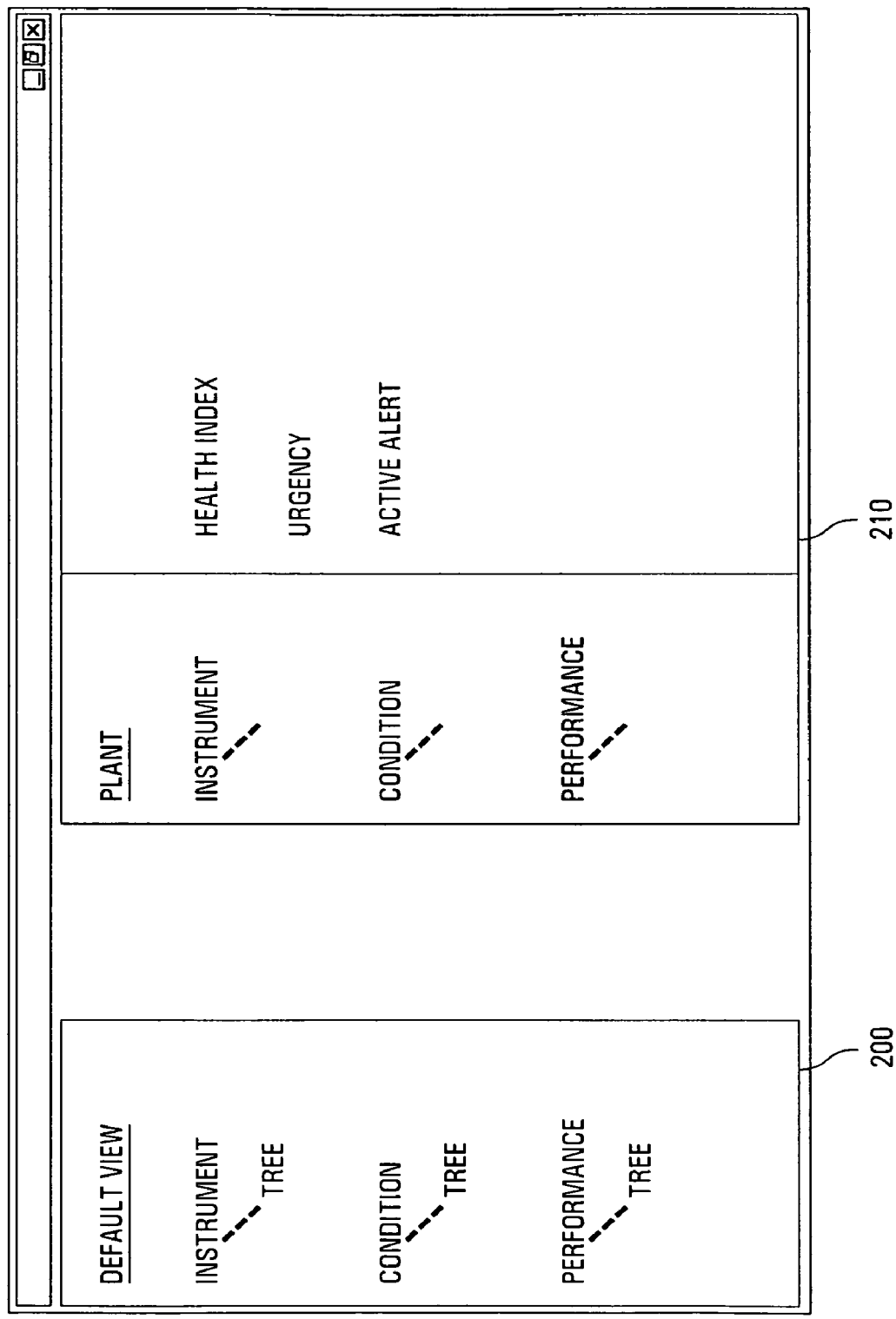
FIG. 4 is an exemplary graphical display that may be provided by a graphical user interface to enable a user to view reports regarding different levels within a process plant.
Figure 5:
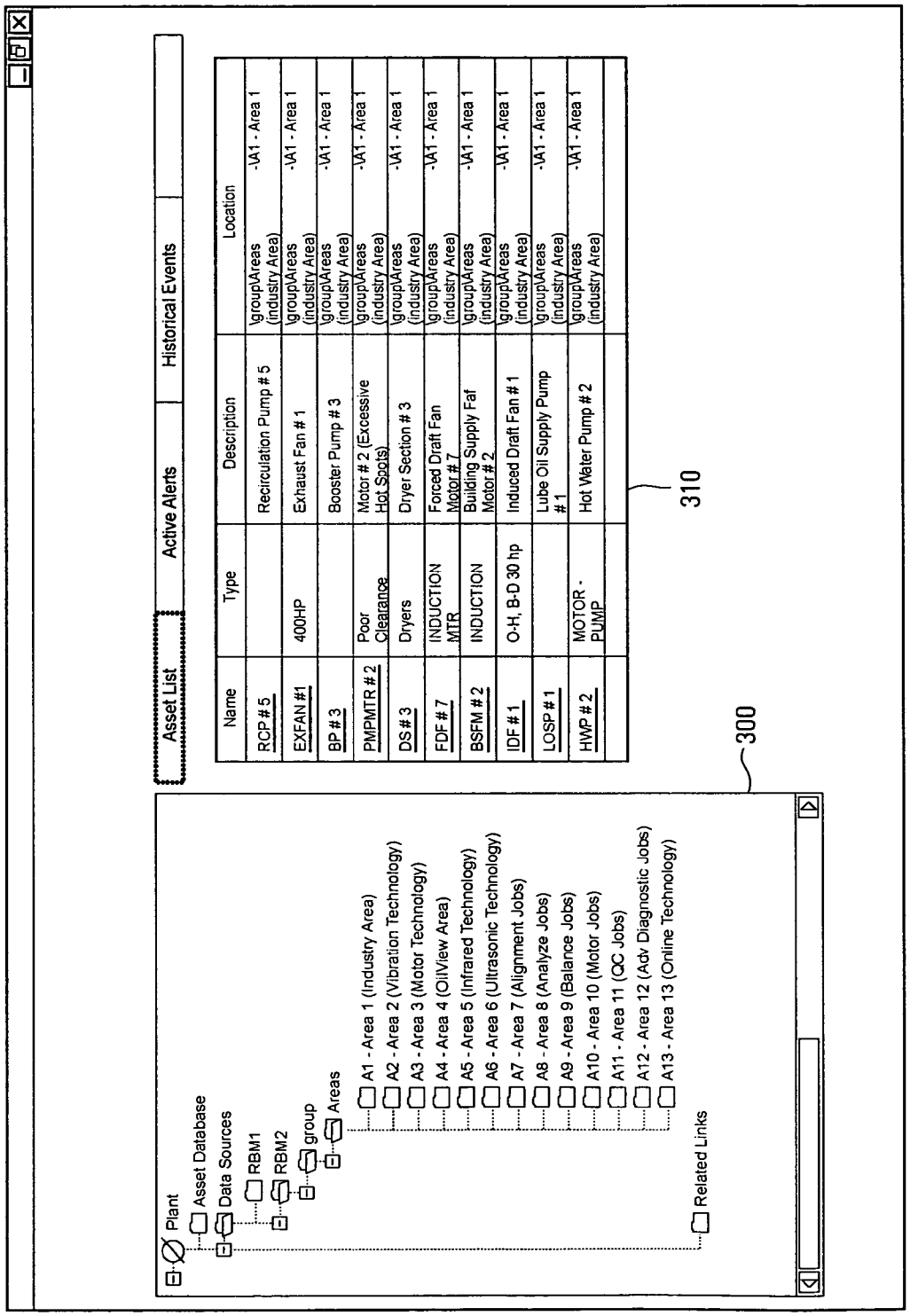
FIG. 5 is an exemplary graphical display that may be provided by a graphical user interface to enable a user to view status information of lower level entities within a higher level entity.

FIG. 4 is another exemplary depiction of a display that may be provided by the GUI to enable a user to navigate among the various levels within the process plant 10 and report on various status information for the plant and any level thereof to provide consolidated reporting for all entities within the process plant 10. As shown in FIG. 4, a user is provided with a menu 200 of the various levels within the process plant 10. The menu 200 permits the user to easily navigate to view reports on status information regarding different levels and entities within the process plant 10, such as various devices, loops, units, areas, etc., including status information regarding the process plant 10 itself. The menu 200 may be arranged according to the types of information that may be viewed, the various levels within the process plant 10, or any other desired configuration. This configuration may also be user configurable, as described more fully below. An expanded view 210 of the structure of the process plant 10 is also shown along with various status information, such as the overall health index of the process plant 10, the level of urgency associated with the health index, and alert information. Each entity and type of status information listed in the expanded view 210 may be arranged to allow a user to request further detailed information regarding that status information and/or entity. For example, the listed entities and status information may be user selectable icons, similar to a hyperlink in a web page, that link to another report featuring further detailed information associated with the selected entity or status information. In response to a user action or request (e.g., clicking on the link), the display of FIG. 4 may be replaced with the more detailed information, or alternatively, a new window may appear reporting on the further detailed status information regarding the selected level of the process plant 10, including any of the various devices, loops, units, areas, etc.

FIGS. 5-10 are detailed depictions of the exemplary display described above in FIG. 4. Each of FIGS. 5-10 includes a tree level view 300 of various levels within the process plant 10. In this particular example, the tree level view 300 is arranged according to the type of data sources that are made available to the user (e.g., RBMware™ data), which is subsequently arranged according to the various areas (e.g., Area 1, Area 2, etc.) within the process plant 10. This may be in response to a user request to view additional monitoring, diagnostic and optimization information provided by the RBMware™ data source regarding the process plant 10 or a request to view this type of information for all areas within the process plant 10. However, the tree level view 300 may be arranged in any desired manner according to user preferences. Therefore, the tree level view 300 may be arranged by various process plants 10 available to the user, by data source, by area, by unit, etc.

Figure 6:
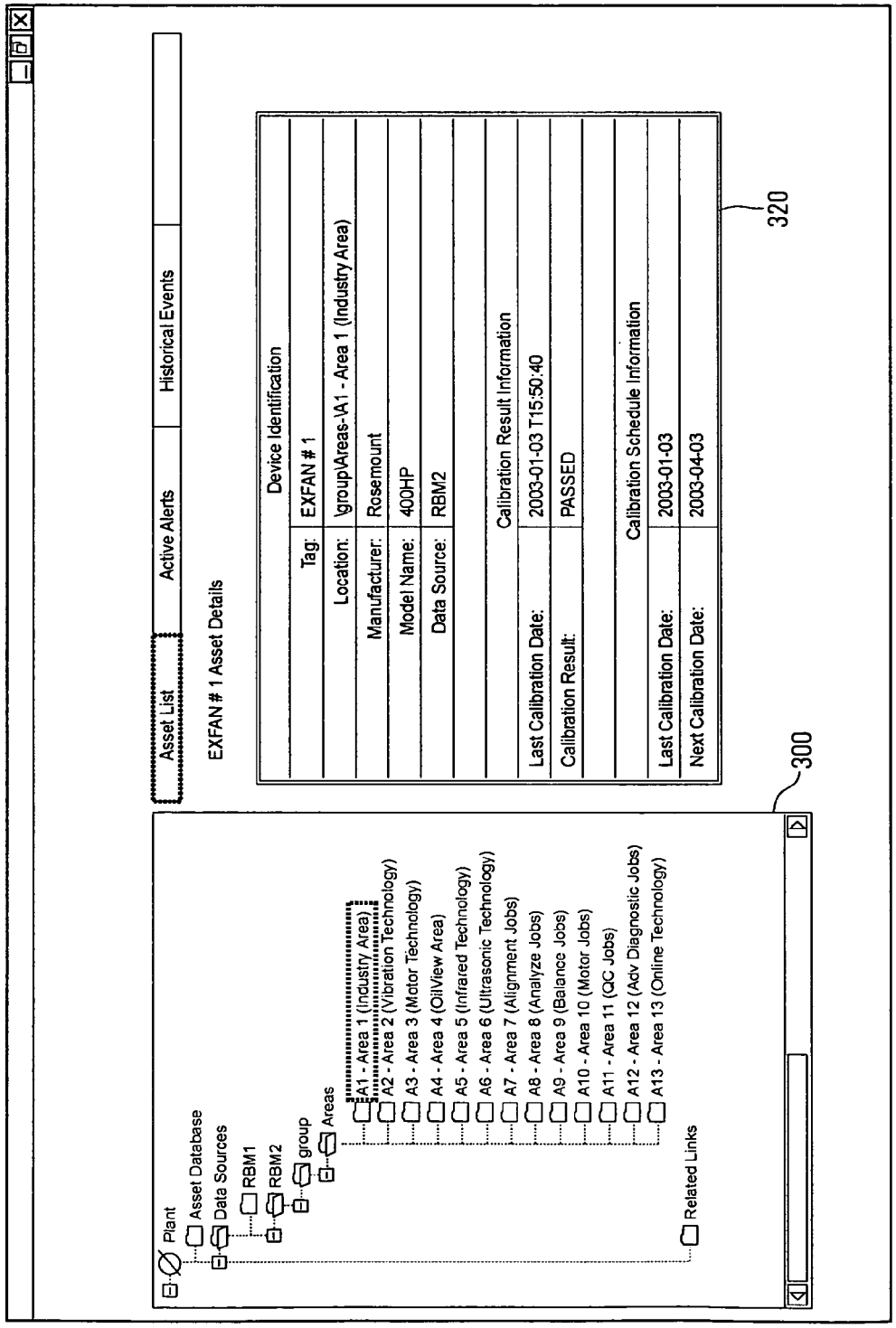
FIG. 6 is an exemplary graphical display that may be provided by a graphical user interface to enable a user to view status information of a lower level entity.

Alongside the tree level view 300, is a representation of further details regarding the selected area (e.g., Area 1). For example, in FIG. 5 a summary 310 of the units, loops, devices, etc. contained within Area 1 is shown with details regarding each unit, loop, device, etc. As with the tree level view 300, the summary 310 may be user-configurable to list various entities relating to, though not necessarily part of, the selected area. Furthermore, status information from various data sources may be included in the summary 310, as determined from the user preferences. Each listed unit, loop, device, etc. may be user selectable to bring up even further detailed information regarding that entity, for example, by using dynamic links associated with each listed unit, loop, device, etc. In response to a user request (e.g. clicking on the alphanumeric identifier), status information regarding the details pertaining to Exhaust Fan #1 (EXFAN #1) may be displayed in a device summary 320 as shown in FIG. 6. Any or all details regarding Exhaust Fan #1, including identification information (e.g., name, location, manufacturer, model, data source), calibration status, configuration, efficiency, etc. may then be displayed in a separate window or in the same window. It will be understood that the particular status information being displayed is not limited to any particular type, amount or level of detail. Instead, as described more fully below, the information that may be displayed can vary according to a user's need and/or preference.

Figure 7:
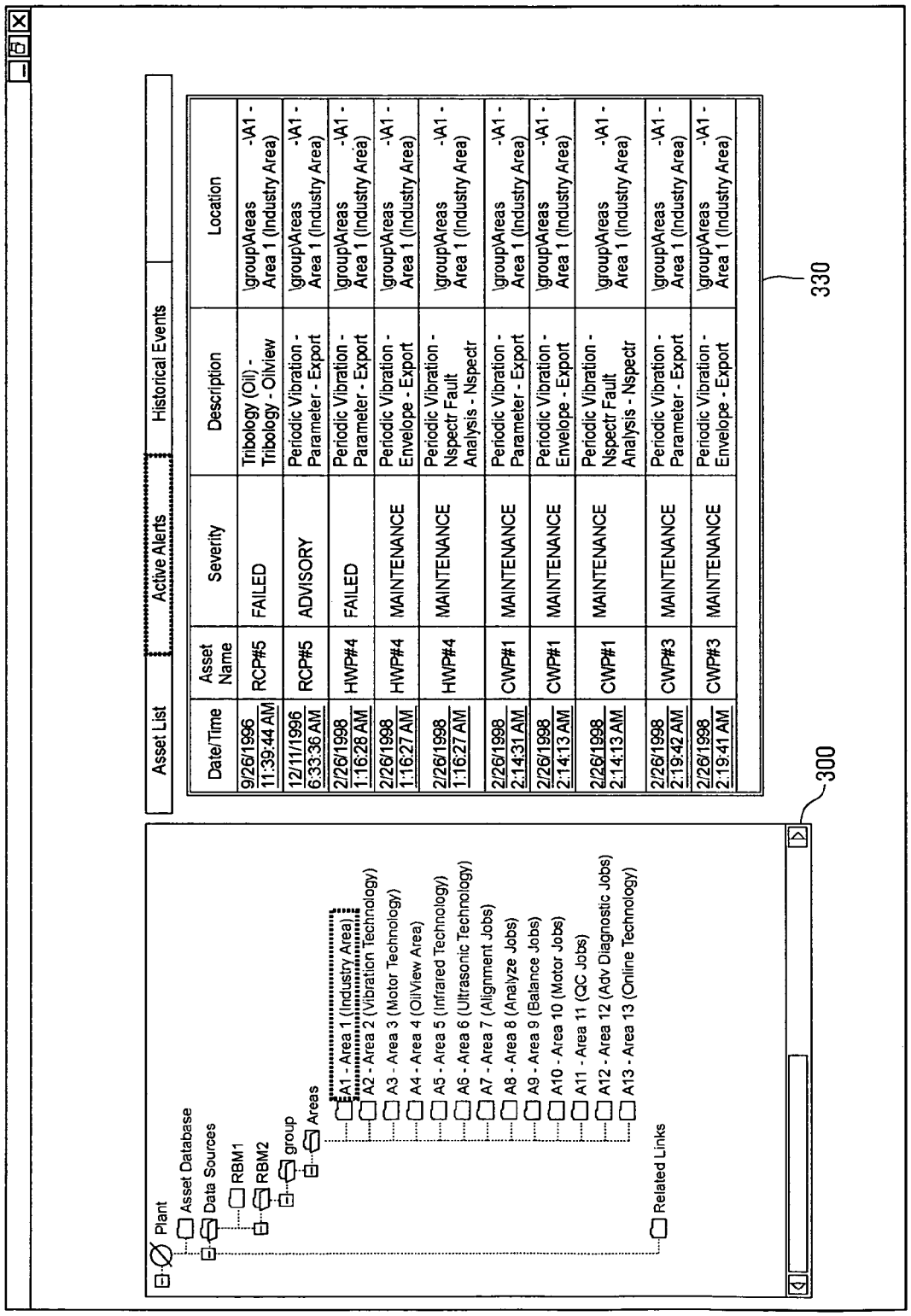
FIG. 7 is an exemplary graphical display that may be provided by a graphical user interface to enable a user to view alert information.

Above the listed status information for Exhaust Fan #1 are more user selectable icons responsive to user actions which bring up further detailed status information. These user selectable icons (or "tabs") reflect summary views of available information and are arranged along the top of the display to allow navigation among further available status information. For example, as shown in FIG. 7, a user may view all current alerts or events associated with Area 1 by selecting the "Active Alerts" tab. The resulting display 330 of active alert information may list each of the of the entities that currently have a problem, along with details regarding the alert such as the date/time, the unit, loop or device associated with the alert, severity of the alert, etc. Any or all details regarding an active alert associated with an entity, (e.g., Exhaust Fan #1) may include status information such as type, description, health, alarms, etc., as shown in the display 340 of FIG. 8. The details may further include recommended actions to be taken given the status information (e.g., repair as soon as possible) along with explanations of or the degree of the current status of the asset (e.g., severity, urgency, etc.) and detected cause (e.g. event fault).

Figure 9:
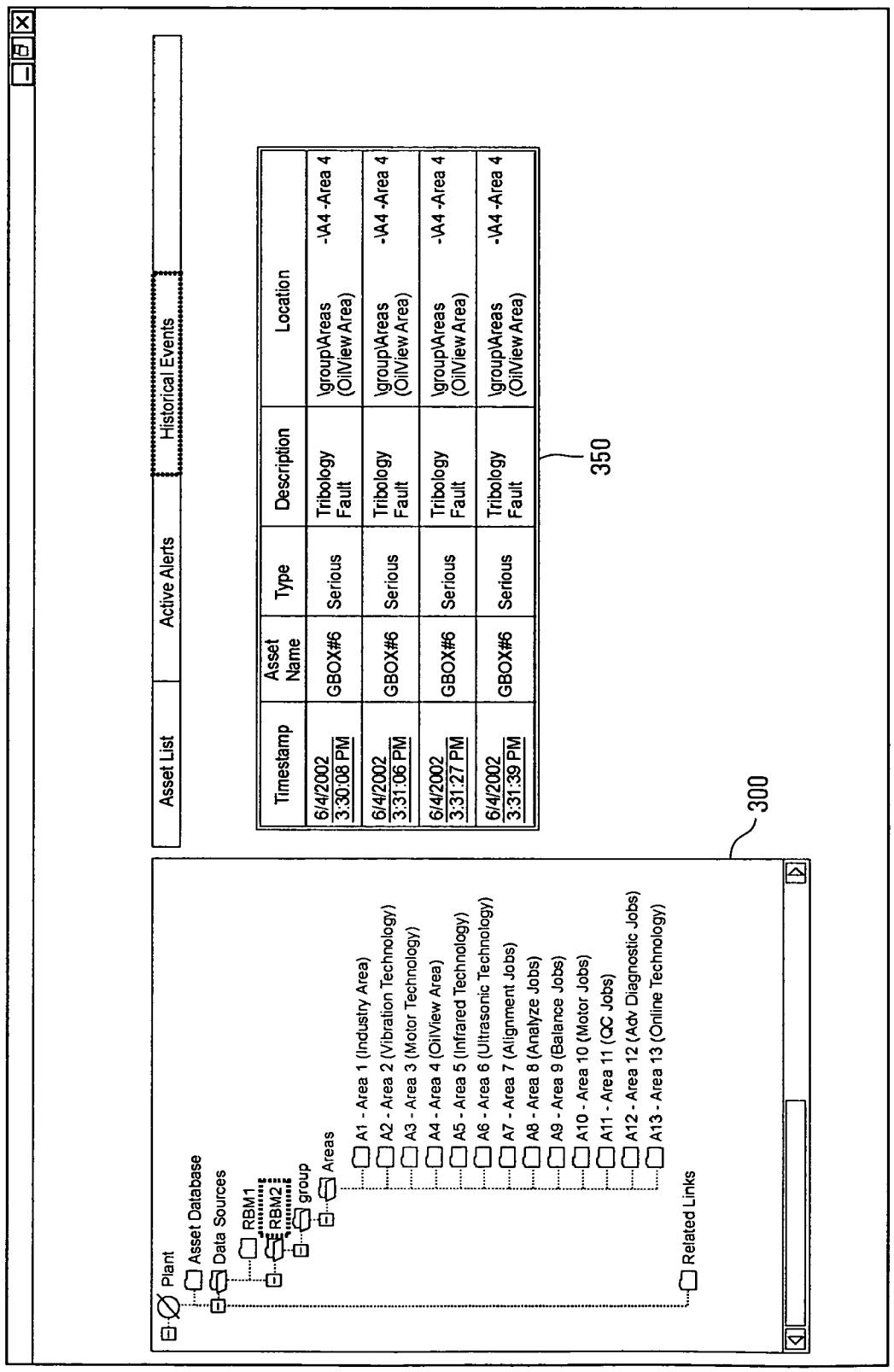
FIG. 9 is an exemplary graphical display that may be provided by a graphical user interface to enable a user to view audit trail information of historical events.
Figure 10:
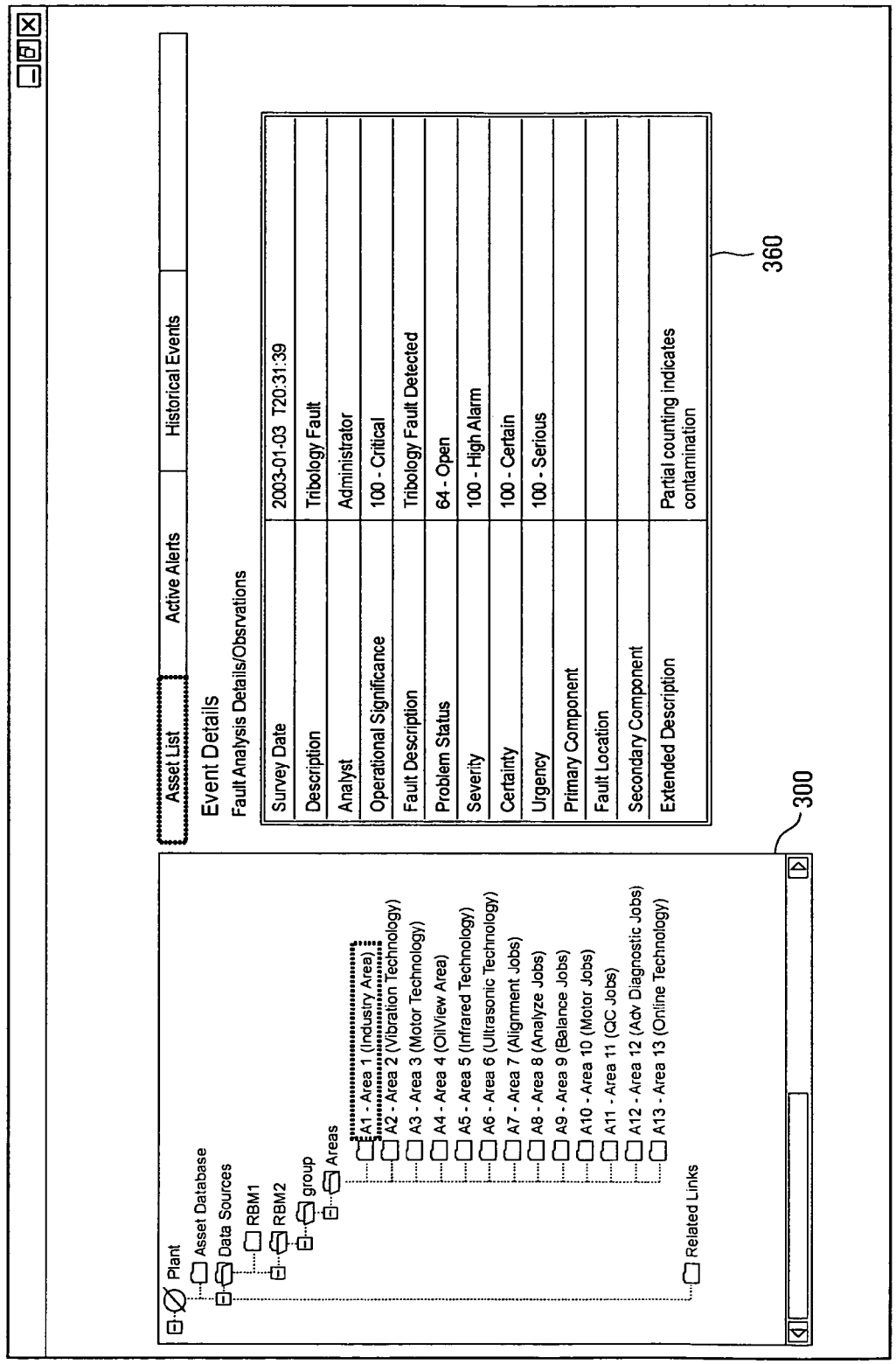
FIG. 10 is an exemplary graphical display that may be provided by a graphical user interface to enable a user to view detailed audit trail information for a historical event.

As shown in FIG. 9, a historical summary or audit trail 350 may be displayed in response to a user request for "Historical Events". In this particular example, the history regarding a device (a gearbox denoted as GBOX #5) in Area 4 is displayed to allow the user to quickly assess the progression of the state of GBOX #4. The historical summary 350 may further be used to display a history of all entities within a given location, a history of a particular entity, a history of a particular type of fault, etc. Each historical entry may further be user selectable to display details regarding that particular event, as shown in the display 360 of FIG. 10. Examples of some of the details that may be listed include date and time of the event, a brief and extended description of the event, event significance, status, severity, certainty, urgency, location, observations, etc.

Figure 11:
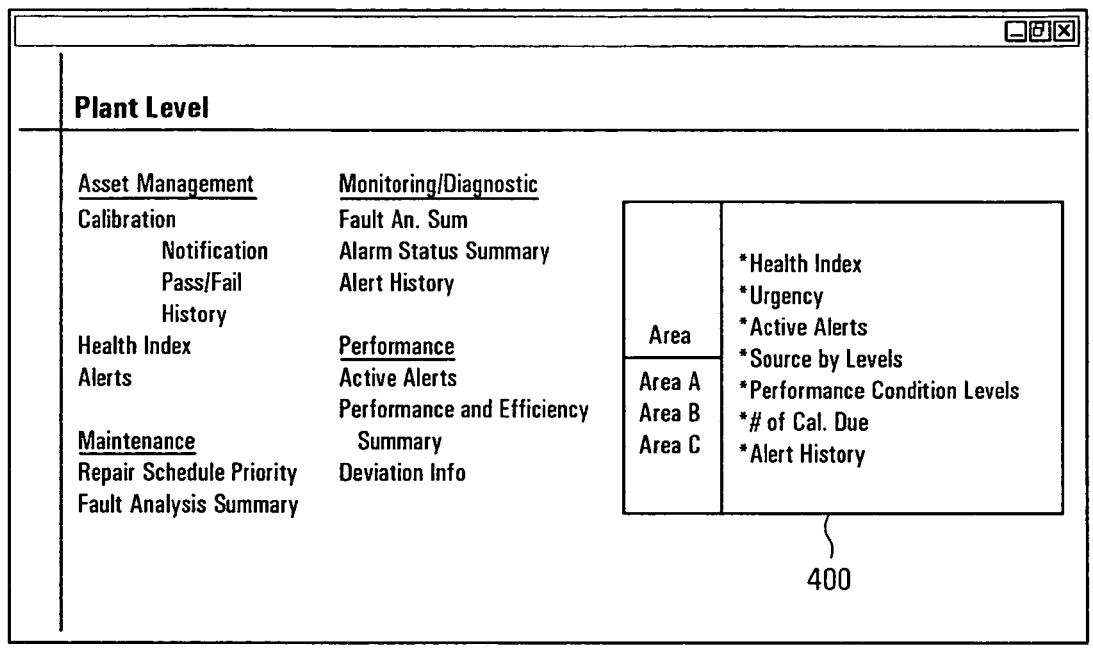
FIG. 11 is an exemplary graphical display that may be provided by a graphical user interface to enable a user to view status information regarding a process plant.

FIGS. 11-15 are further exemplary depictions of displayed reports that may be provided by the user interface routine 58 in response to a user request to view further reports of details for different types of status information at various levels of the process plant 10. For example, in response to a user request from the display of FIG. 4, the GUI display of FIG. 11 is presented. However, it will also be understood that the displays of FIGS. 11-15 may be presented in response to a user action from the displays in FIGS. 5-10, such as from the tree level views 300 or by a user action with a user selectable icon associated with the process plant 10, an area, a unit, a loop, a device, etc. from a GUI as depicted in FIG. 3. The GUI of FIG. 11 depicts available status information regarding the process plant 10. A menu of headings, each relating to a particular type of status information, facilitates navigation among various types of status information regarding the process plant 10 from various data sources. Examples of available status information regarding the process plant 10 includes status information from the maintenance system application 66 (e.g., calibration, alerts, etc.), the asset management tools 70 (e.g., alerts, alert history, repair schedules, etc.), the asset utilization expert 50 (e.g., health index, performance, etc.) or any other desired data source. A smaller view of the display of FIG. 4 may also be provided as a summary window 400 within the display to facilitate navigation among the various levels of the process plant 10 and to display a summary of the status information related to the process plant 10. In this example, the areas of the process plant 10 are depicted in the summary window 400 to facilitate navigation to the various areas within the process plant 10.

Figure 12:
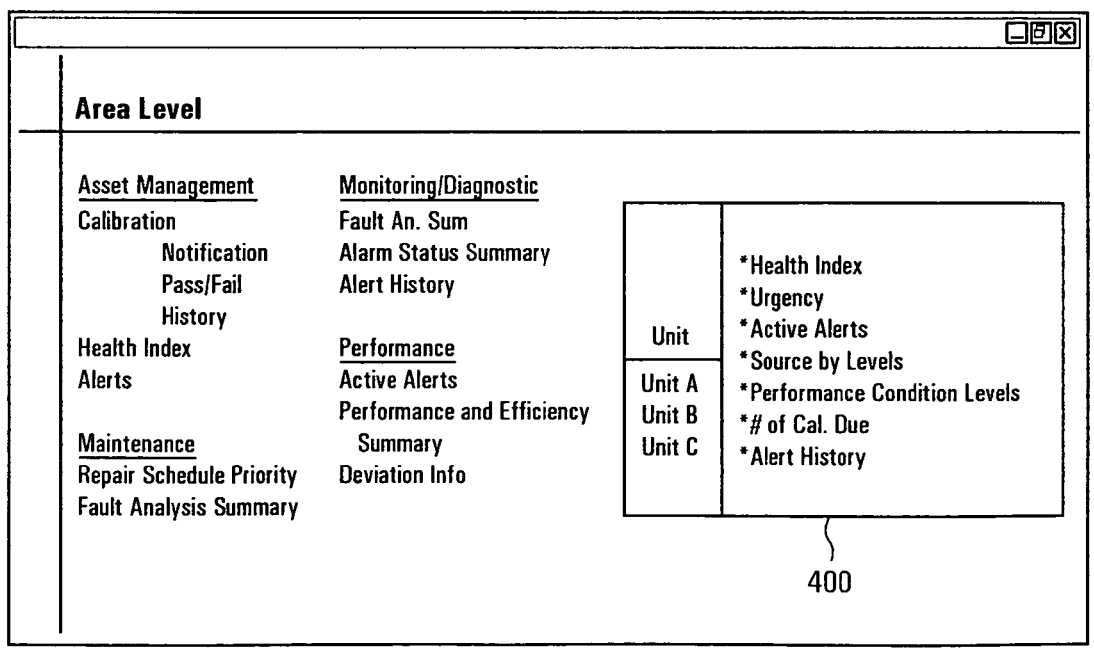
FIG. 12 is an exemplary graphical display that may be provided by a graphical user interface to enable a user to view status information regarding an area within the process plant of FIG. 11.
Figure 13:
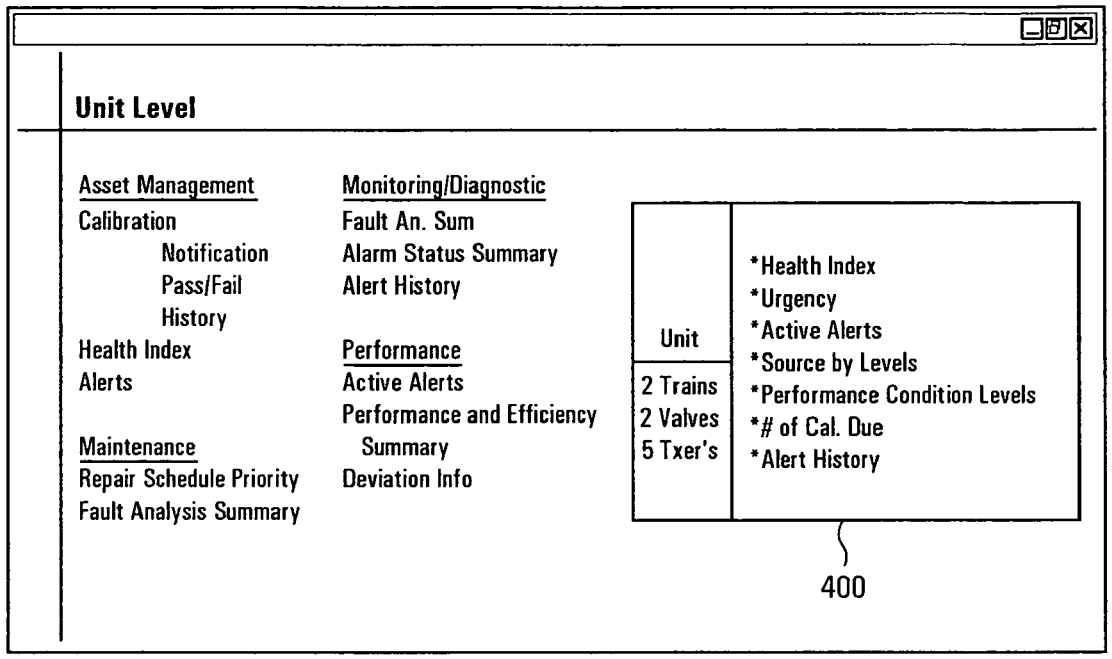
FIG. 13 is an exemplary graphical display that may be provided by a graphical user interface to enable a user to view status information regarding a unit within the area of FIG. 12.
Figure 14:
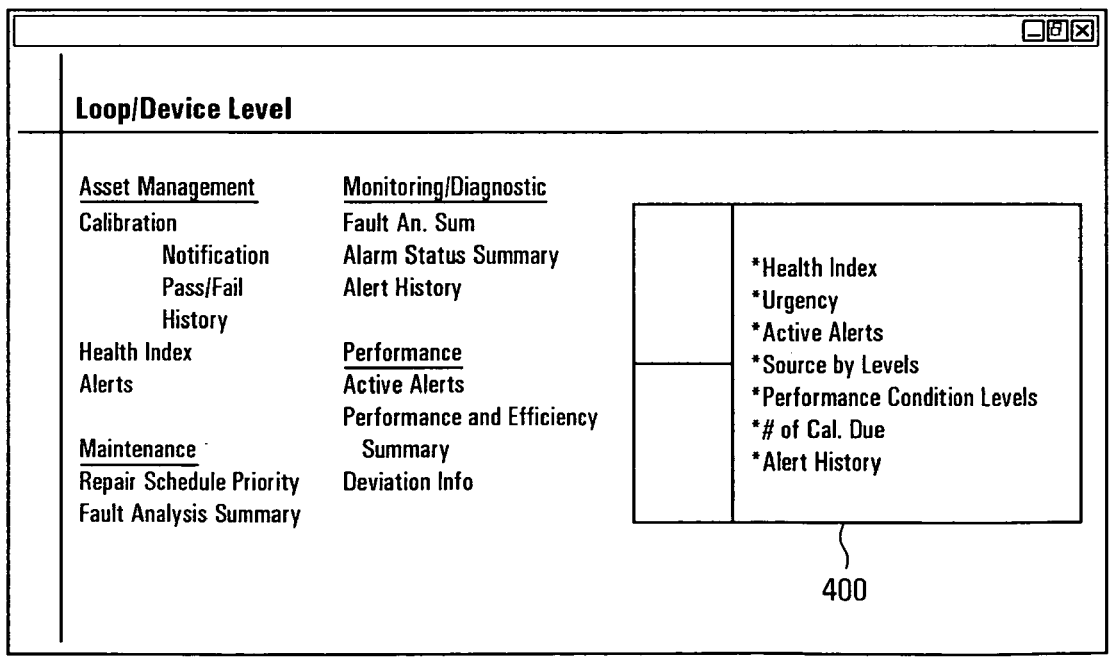
FIG. 14 is an exemplary graphical display that may be provided by a graphical user interface to enable a user to view status information regarding a loop or device within the unit of FIG. 13.
Figure 15:
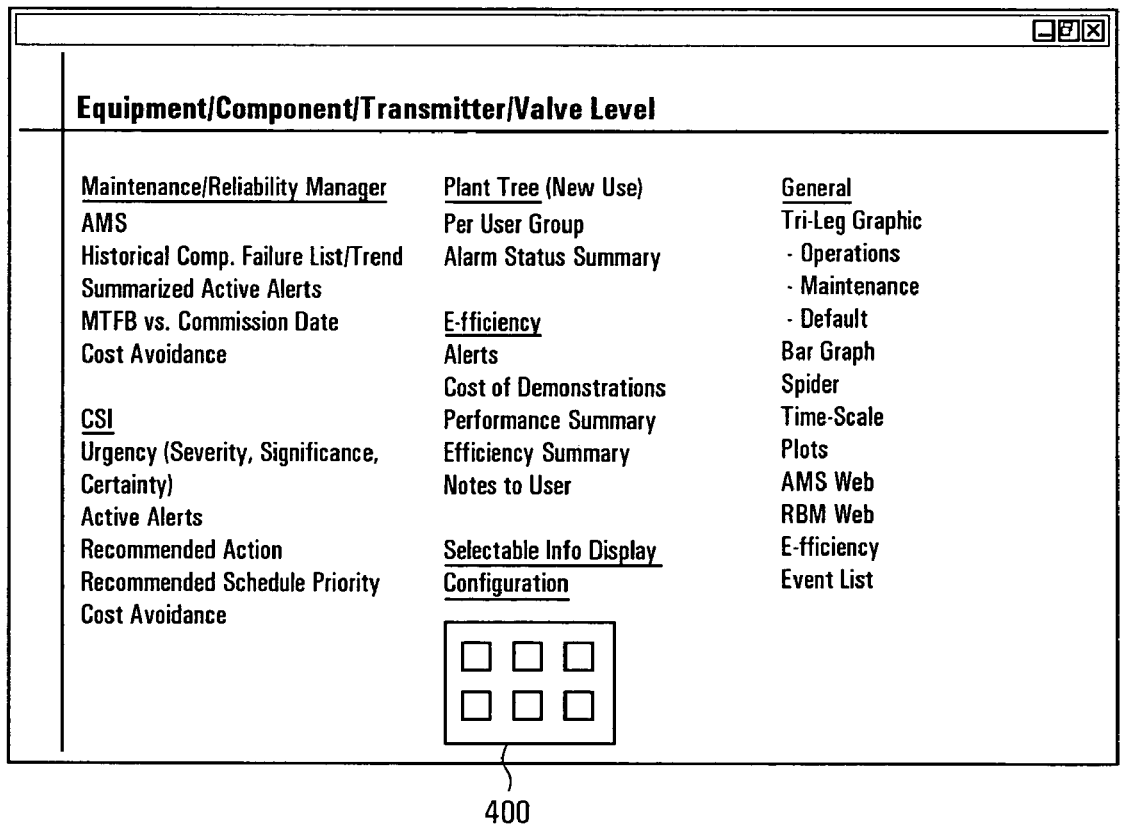
FIG. 15 is an exemplary graphical display that may be provided by a graphical user interface to enable a user to status information regarding equipment, a component, a transmitter or a valve.

Displays similar to that shown in FIG. 11 may be provided for each level or entity within the process plant 10. For example, FIGS. 12-15 are exemplary depictions of displays that may be provided by the GUI to view status information for an area (FIG. 12), a unit (FIG. 13), a loop or device (FIGS. 14 and 15). Each of the displays shown in FIGS. 12-15 are shown to have a menu with status information headings, each of which may be linked to a further report containing detailed status information that may be displayed in response to a user request to view that type of status information. A summary of the components that make up an area (e.g., Unit 1, Unit 2), the components that make up a unit (e.g., 5 transmitters, 2 valves, etc.), or any other level are provided alongside a summary of the status information for the respective area, unit, loop, device, etc. While the displays of FIGS. 12-14 are shown to include similar types of status information, the values and variables associated with the status information will generally change with each entity being reported. For example, in both FIGS. 14 and 15 depict GUIs reporting status information regarding a loop or device. Even more particularly, FIG. 15 depicts a GUI reporting status information regarding equipment, components, transmitters and/or valves. However, the type of status information and arrangement has been altered from that of FIG. 14. Rather, status information has been arranged according to a combination of type of status information (e.g., urgency, alerts, recommendations, etc.) and data sources (e.g., AMS, CSI, E-fficiency™). Additionally, the user is presented with a variety of display options, including the Selectable Information Display Configuration 410, with which a user may control the arrangement of information, and General presentation options including Tri-leg graphs separated by type (e.g., operations, maintenance, default, etc.), bar graphs, spider graphs, etc.

Each of the displays, depicted above and further below, may be user configurable to depict different types of status information the user may be interested in or different levels within the process plant 10. For example, the user may modify which types of status information are to be included in the user's report being displayed in FIGS. 3-20. Some of the displayed information may, therefore, be dynamic in terms of allowing the user to manipulate and configure the types of status information being displayed and further configure which entities are to be reported on.

In order to manipulate the information to be displayed in a user's report, the GUI may be implemented to display the user's preferences regarding his report. The user is presented with a variety of options on how to configure the report. These options include the types of status information the user may view, the various entities the user may view status information for, options as to how the status information is to be displayed (e.g., graphics, text, etc.), the layout of the status information (e.g, health information centered and pronounced with related production information off-center and less pronounced), etc. Among the options may be status information that must always be included in the report, which is indicated to the user as being static information. The user is able to select from among the available options to add, delete or manipulate the status information. The user profile may then be saved, for example, to a server, and accessed by the asset optimization reporter 60 each time the user calls up a report. Alternatively, the user profile may reside on the user's local computer and be accessed by the user interface routine 58 each time a report is generated. The user may also be permitted to create different reports for different types of status information, different entities, etc. and save each as a separate user profile or as a condition in a single overall user profile. For example, the user profile could contain a provision that if the report is to pertain to an area, a graphical representation of that area is presented with status information displayed in alphanumerics.

Alternatively, the status information displayed in a report may be implemented with a "drag and drop" approach, wherein the user can configure the layout of the report as it is being viewed by selecting an icon representing an entity, dynamic link, status information, etc. The selected icon may be cut and pasted to its new location, or dragged and dropped in its new location. Entities may be merged into other entities by pasting the icons on or dragging the icons to an existing entity, thereby defining functional areas, units, loops, devices, etc. according to the user's needs. Additionally, entities may have as many dynamic links associated with them as desired to bring up information about other entities, other data sources, other reports, other types of status information, etc. As an example, the user may be presented with a default report. This default report may be presented whenever a user accesses a report for the first time (e.g., a new user), accesses a particular type of status information for the first time, accesses status information for a particular entity for the first time, utilizes a new GUI for the first time, etc. The default report may still pertain to particular types of status information for a particular entity, which may relate to the user's responsibilities. That is, even though the user is presented with a default report, a user profile may already be assigned to the user which lists static information to be included in the report and restrictions applicable to the user. In addition, the default report may include dynamic status information where it is predicted by the asset optimization reporter 60 that the user will be interested in particular types of status information for certain assets. It may further be predicted how the user would like to view the information (e.g., the layout). These predictions may be based on the user's responsibilities within the process plant, other profiles or reports that the user has used, profiles and reports of other users having similar responsibilities, etc. Alternatively, all available status information may be presented to the user in a generic format. However, the user is free to add, delete or otherwise manipulate the dynamic status information in the default report to the user's own preferences.

Each piece of dynamic status information is therefore presented as a user selectable icon that the user can capture, move, manipulate or delete from the report. Additional status information may be added to the report from a separate menu providing the user with a selection of all types of status information available to the user. The choices and preferences selected by the user may be maintained as part of a user profile, residing at the user's computer, at any data storage device within the process plant 10, or at a storage device located remotely from the process plant 10. Each time the report is reconfigured, the user profile may be updated and stored such that the user's preferences are always current and the next time the user views the report, it will be displayed according to the last known preferences. A user may also need to view numerous reports on various entities and status information. If desired, a separate profile for each type of report may be maintained, thereby allowing the user to configure each report separately. For example, a maintenance person may view health and performance data when viewing a report on a first device, but may only want to view health information when viewing a report on a second device. Alternatively, the same layout and type of status information (still based on the user's preferences) may be included in each report for various areas, units, loops, devices, etc. Each time a user views a report, the user interface routine 58 may determine the user's identity (e.g., at a login screen), and retrieve the user profile associated with that identity. If the user profile is dependent on the entity or status information being reported, a user request for the particular entity or status information may prompt the user interface routine 58 to retrieve the appropriate profile. The user interface routine 58 may then read the profile and display the information accordingly.

However, it may be preferable that some static information be implemented that the user must always keep in the report. For example, a report for a maintenance person assigned to monitor and maintain a particular device may have the health index for that device always displayed, whereas information regarding the performance and efficiency of the device may be dynamic information the maintenance person has selected to include in a maintenance report. That is, the maintenance person may decide to include the performance and efficiency information, because it has an appreciable impact on the health of the device. Likewise, a report directed to a process operator may always include status information regarding the performance and efficiency of the loop being controlled, in addition to user configurable dynamic information such as health information of the devices within that loop, because the health of the device may have a future impact on the operation of the loop, and is therefore of interest to the process operation.

The static information may also reside in the user profile, though the user will not be permitted to configure the static information. For example, the user's responsibilities and duties within the process plant 10 may be indicated in the user profile without allowing the user to modify those responsibilities and duties. A maintenance person, therefore, could have a user profile describing his specific position (e.g., maintenance person), the devices, loops, etc. that the maintenance person is responsible for, particular duties with respect to these assets (e.g., monitor device health), etc. The user profile may also include restrictions, that the user cannot alter, which restrict what the status information the user is allowed to view in a report. The restrictions may be imposed based on reading the user's responsibilities. The user interface routine 58 may therefore read the user profile to determine not only the user's preferences, but also details regarding the user in order to display particular types of status information that are of interest to the user and also status information that must necessarily be reported to the user to allow the user to complete his duties and responsibilities.

While many of the above displays have been disclosed herein as containing primarily textual and numerical information, it has also been indicated that the same status information may be depicted graphically. Whether the reports are displayed in a textual, numerical or graphical format (or any combination thereof), may be dependent on the type of status information being displayed (e.g., indices may generally be represented numerically). The format of the report may also be dependent on the preferences of the user as detailed in the user profile. For example, the user may prefer to view health information using a combination of textual and numerical information with accompanying graphics of the area, unit, loop, device, etc. that the indices relate to, as shown in FIG. 3. Alternatively, the user may prefer to view a different type of status information in a primarily textual and numerical format, as shown in FIGS. 5-15. Therefore, the format used to display the status information may be dependent on the user's particular preferences as reflected in the user profile. Graphical formats may include visual representations of an entity, bar graphs, pie charts, time scales, plots, trend charts, etc.

Figure 16:
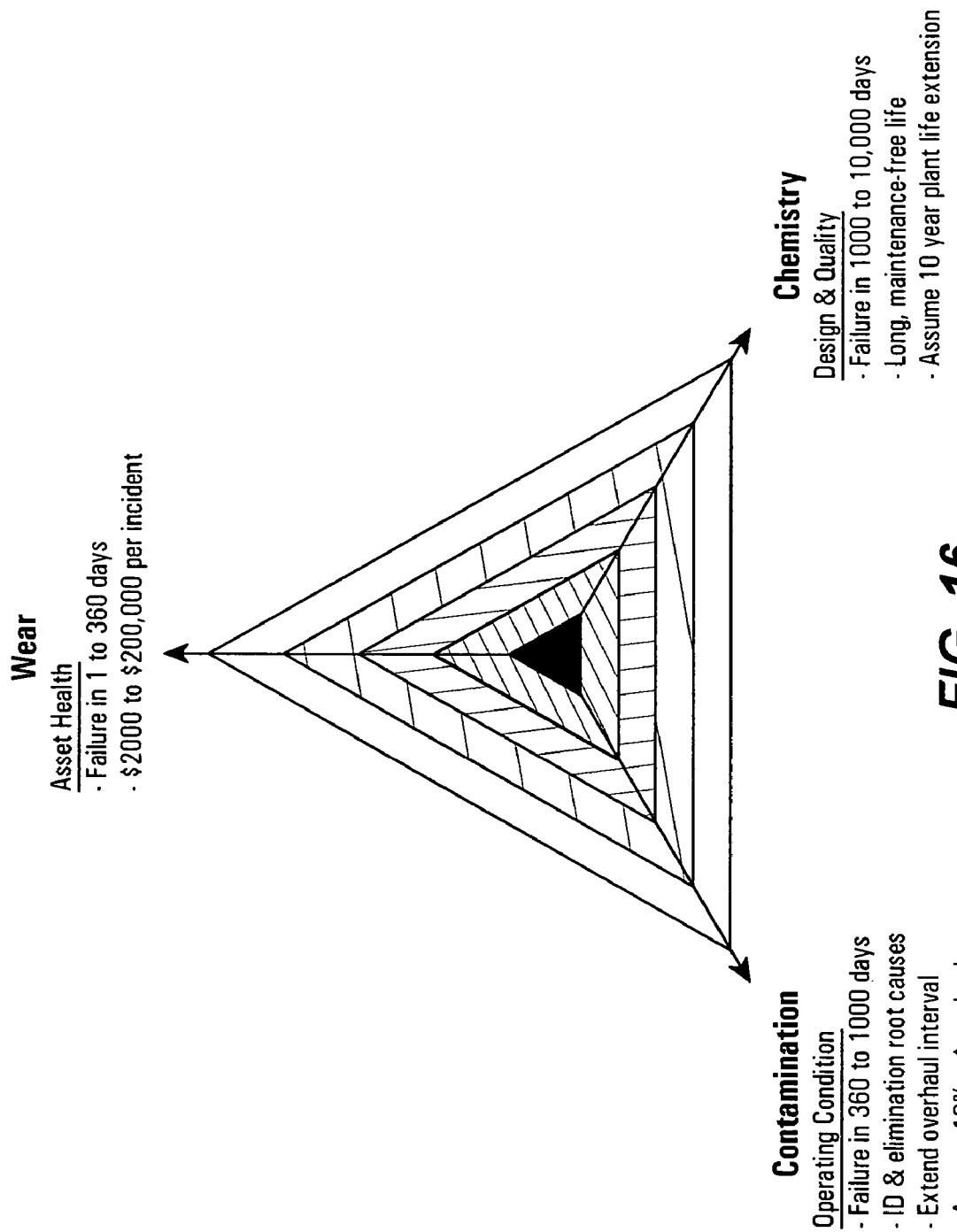
FIG. 16 is an exemplary graphical display that may be provided by a graphical user interface to enable a user to view a graphical depiction of status information.
Figure 17:
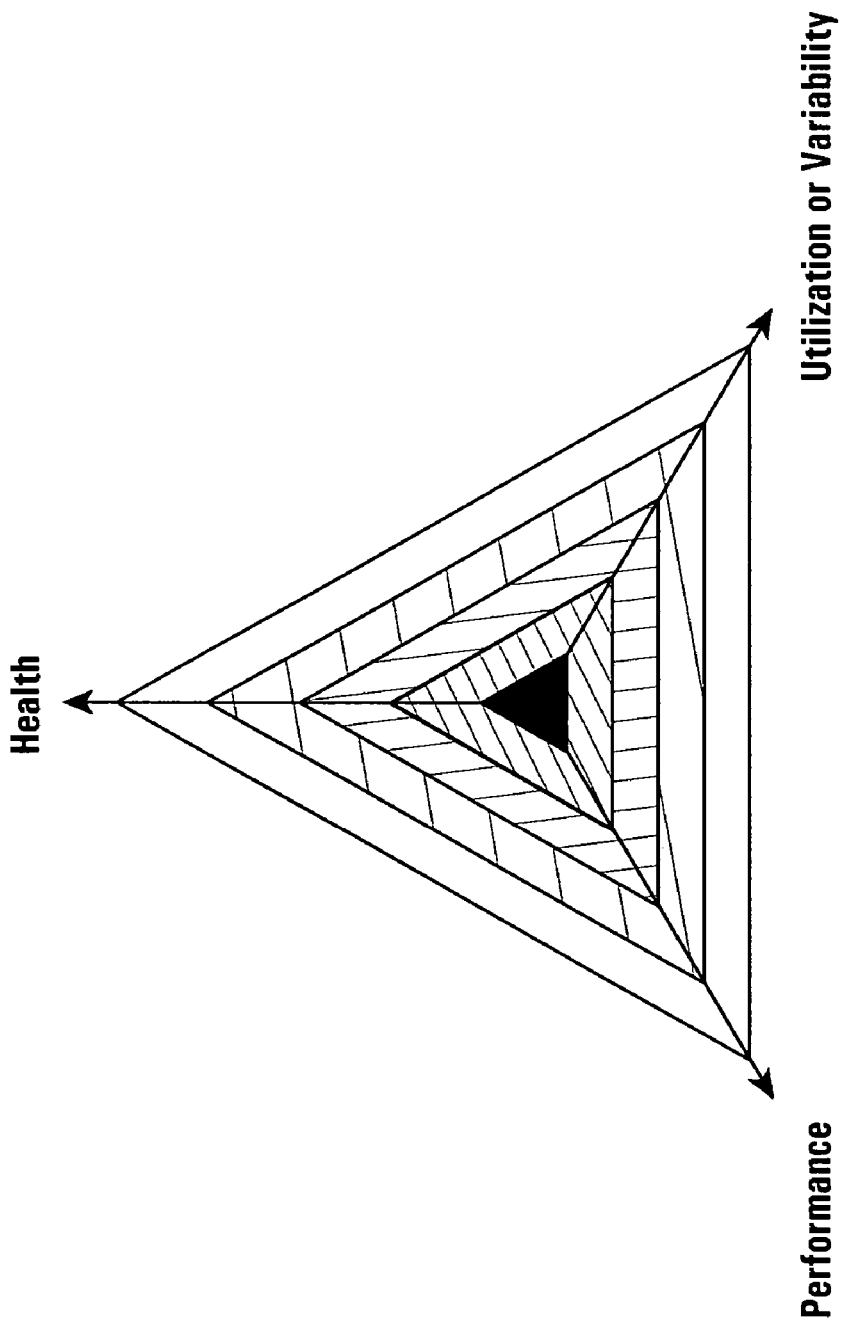
FIG. 17 is an exemplary graphical display that may be provided by a graphical user interface to enable a user to view graphical depictions of different types of status information.

FIGS. 16-20 are exemplary depictions of displays that may be provided by the GUI to enable a user to view graphical representations of status information. For example, FIG. 16 is a depiction of a graphical display having three legs, where each leg is associated with a variable or status category (e.g., wear, contamination, chemistry) depicting status information regarding the lubrication of a device, as disclosed in U.S. Pat.

No. 5,817,928, referred to above. Further details regarding each type of status information may be associated therewith. For example, wear may generally be associated with the health of the particular asset, and, therefore, may include further detailed status information regarding the predicted failure of the device, a summary of the cost analysis for each failure incident, etc. Contamination, on the other hand, may be associated with the operation of the device, including a summary of the anticipated time until failure, identification of failure causes, suggestions to maintain optimal use, operational costs due to repair, etc. Chemistry may be related to the design and quality of the device, and, therefore, include status information such as the expected or predicted lifetime.

Each of the different types of status information may therefore be associated with a different category. For example, each category of Wear, Contamination and Chemistry may have associated therewith status information pertaining to failure, economic or financial analyses, predictive analyses, KPIs, etc. The types of status information to be categorized may include both static and dynamic information. With dynamic information, the user is able to select the type of status information to be categorized (e.g., the user wants to see a financial analysis with respect to each particular category), whereas the user must always view the static information (e.g., predicted failure information to be present on each report). Each type of status information received by the asset optimization reporter may thus be categorized according to how it may be used in terms of decision-making or process control. Status information received by the asset optimization reporter may further be used as the basis for further types of status information. For example, health and utilization information may be used to predict failure. Failure information may, in turn, be used to determine financial and economic information (e.g., cost to replace a part now versus later, impact on the plant profits, etc.) Each category, therefore, may be related to decision-making (e.g., quality) or process control (e.g., operating condition). Each of the details may be a user selectable icon which allows the user to retrieve further status information regarding the health, financial analysis, predicted failure, etc.

However, just as with the reports described above, the graphical representations may be user configurable to display different status information regarding a different device, loop, unit, area, etc. For example, in FIG. 17, status information relating to the health, performance, utilization and variability of an entity or level may be selected by the user to be displayed in a graphical representation and format similar to that of FIG. 16, thereby replacing the wear, contamination and chemistry information. Thus, the reports may include various categories which may be based on user preferences. Examples of categories that may be included in a report, in addition to the above, include business, operations, maintenance, failure, quality, and performance, the choices of which and the definition of the category may be based on user preferences or may be predefined. Alternatively, each leg may be associated only with a particular type of status information, or each leg may be associated with a different entity, where the type of status information is the same for all legs. The user may also select the particular device, loop, unit, area, etc. that the graphic is to represent.

Each leg of the graphical representation is associated with a different type of status information and/or status category, which may represent only a single data source of status information (e.g., health information is only reflective of a health index from the asset utilization expect 50) or a result from a combination of various sources and specific to a particular type of status information (e.g., aggregate health information gathered from maintenance systems, index generation routines, etc.). As the various status information fluctuates, the various legs of the graphical representation fluctuate accordingly to indicate the gravity or severity of the situation. For example, if the graphical representation relates to a loop within the process plant 10 and the performance level of that loop is low, the performance leg of the graph will recede towards the center of the plot. Alternatively, low severity may be represented by the center of the plot with higher severity levels radiating out from the center.

The determination of the severity for any particular status category may be based on the status information received and categorized within that particular status category. Each type of status information categorized under a particular category may have a level of severity associated therewith. The severity level for that particular category may then depend on the severity level for each type of status information, which may be by a weighted average. Alternatively, the severity level for that particular category may be dictated by the type of status information that has the greatest severity level. For example, the health for a unit may have all the health information for every loop and device within that unit categorized into the health category. If the severity level of the health of just one of the devices is high, even though the severity levels for all other loops and devices within the unit are low, the severity level for the health category for the unit is also high because health of just one device may affect the overall health of the unit despite the fact that all other devices and loops within that unit are healthy. The severity levels may be part of or associated with the status information as it is received by the asset optimization reporter, or the severity levels may be determined once the status information is received and analyzed.

The user may thus readily understand whether the health of the loop has been affected merely by viewing the leg associated with the health of the entity. If the health remains relatively unaffected, it may indicate to the user that the source of the performance problem is not within the loop itself, but resides in a related device, loop, etc. within a common unit. Therefore, a user may readily call up a report relating to a higher level within the process plant (e.g., the unit containing the loop) to begin a top-down approach to identifying the root of the performance problem.

Figure 18:
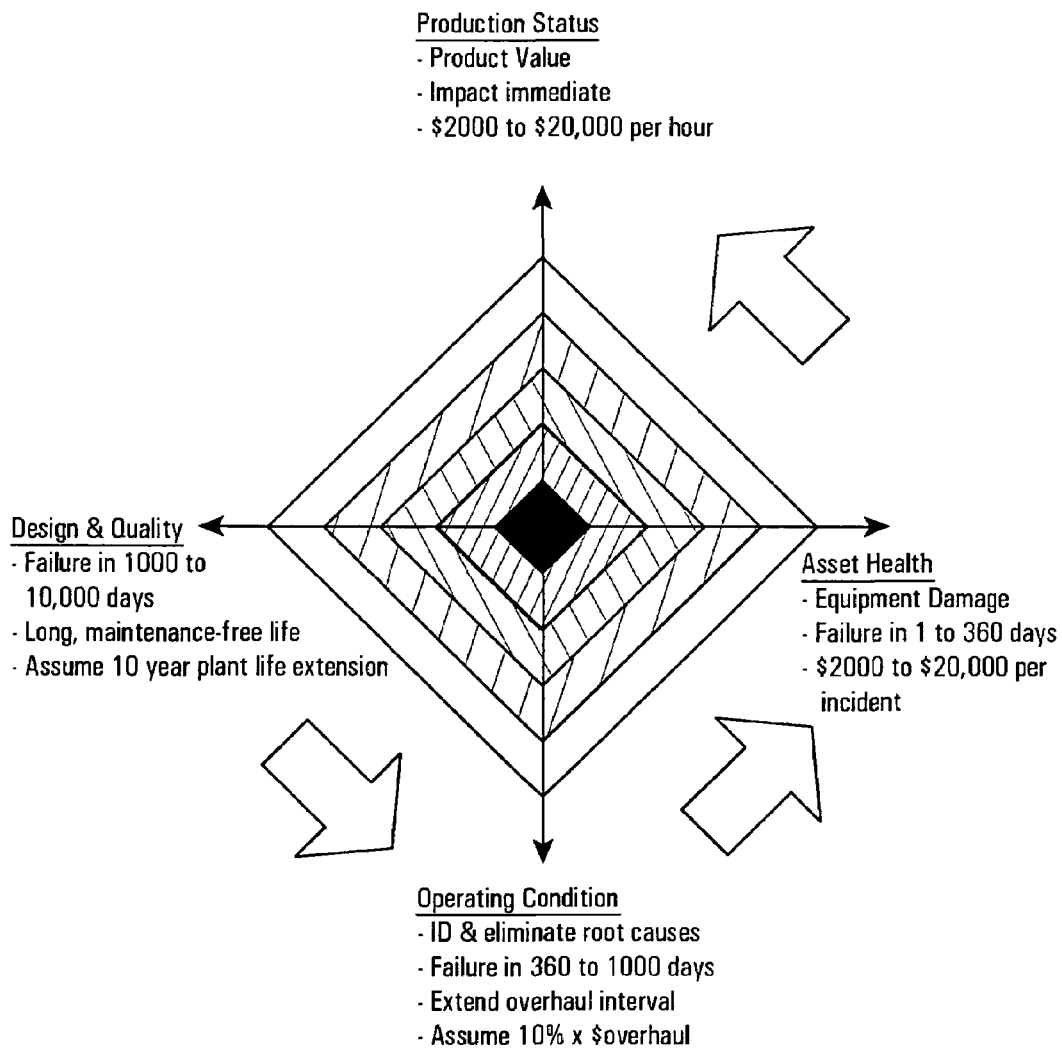
FIG. 18 is an exemplary graphical display that may be provided by a graphical user interface to enable a user to view variations of the graphical representations that may be used to depict status information.

FIG. 18 is an exemplary depiction of an alternative display that may be provided by the GUI to enable a user to view graphical representations of status information. As seen in FIG. 18, the graphical representations of FIGS. 16 and 17 have been replaced with a four-legged representation to indicate more than three categories, where the level of the status bar associated with that status category or status information increases or decreases with the severity of the situation. As with FIGS. 16 and 17, the user may be permitted to vary the type of status information associated with each leg of the graphical representation, and, in fact, the addition (or deletion) of another leg may be part of the user preferences. For example, FIG. 18 may be found to be of particular importance to a maintenance person in monitoring and maintaining an entity. Provided design and quality remain adequate, production should generally remain high, in turn leading to little wear and high product quality. Each of these factors are respectively represented in the plot of FIG. 18 by tracking design and quality variables, operating variables, asset health and production status. Further detailed status information related to each variable may also be provided as indicated. While a maintenance person may almost always need to view status information on the design and quality, operating condition, and asset health, which may be presented as static information, production status (generally of interest to a process operator or business person) may be of interest to the maintenance person because maintenance has an impact on the production status. The maintenance person may have therefore decided to include this variable on the graphical representation as dynamic information. As with FIGS. 16 and 17, each variable or type of status information may be a user selectable icon that can be included, excluded or replaced with a different variable or type of status information. In addition, the user selectable icon may link to further detailed information related to that particular variable.

Figure 19:
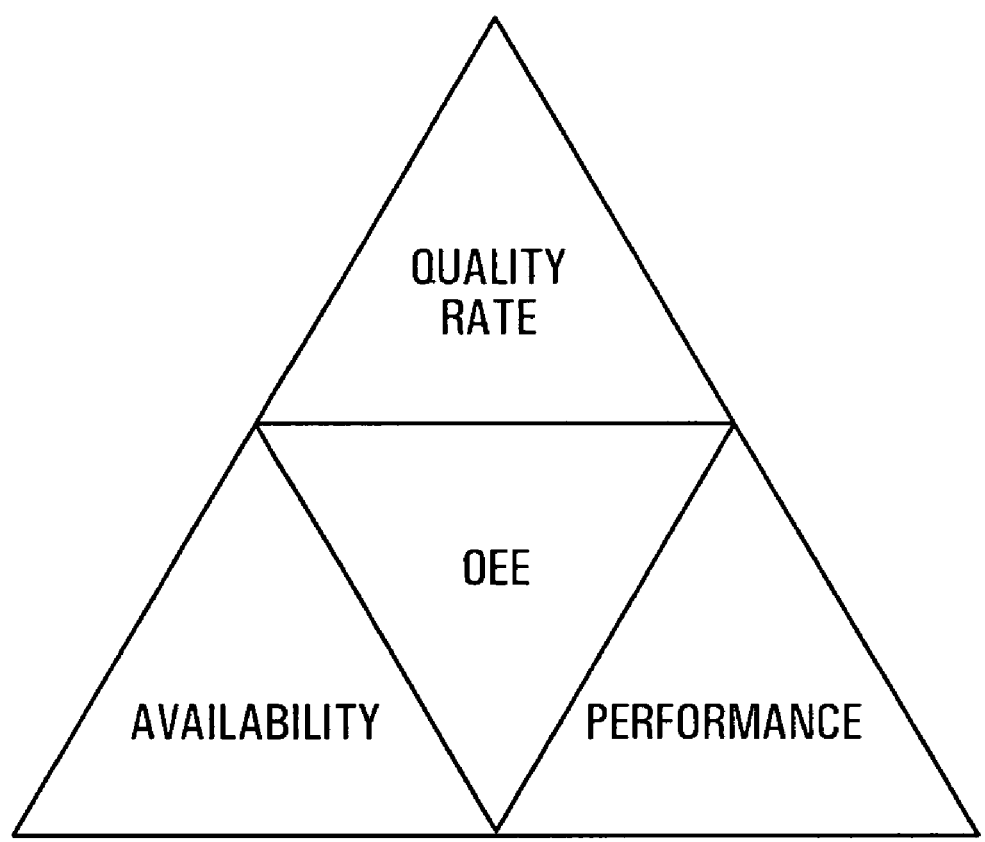
FIG. 19 is an exemplary graphical display that may be provided by a graphical user interface to enable a user to view business information using a variation of the graphical display of FIG. 18.

FIG. 19 is an exemplary depiction of yet another alternative display that may be proved by the GUI to enable a user to view graphical representations of status information regarding business information. This particular display may be of particular interest and importance to business person, though may be applicable to any other user within the process plant 10 to display other variables associated with the process plant 10, areas, units, loops, devices, etc. In particular, the display of FIG. 19 is set up to display various KPIs, and even more particularly to display operating equipment effectiveness (OEE). OEE is generally a combination of factors, including availability, performance and quality rate. Availability typically refers to the uptime (i.e., percentage of time that the asset is available for productions, excluding planned downtime) of the plant, an area, a unit, a loop, a device, or whatever entity is being reported on. Performance may refer to the ratio of actual production compared to the theoretical amount of production that could have been produced. Quality rate refers to the percentage of production out of the total that did not require re-work. Business applications may calculate a value for each of these variables and display them on a leg of the plot. While the graphical representation may operate similar to those above, variations in shading or color may also portray variations in the status information. Again, each variable may be replaced with other variables of interest to the user. For example, availability may be increased by scheduling repair outages as opposed to unplanned repairs. Therefore, status information as the health of devices or loops of particular importance may be part of the business person's report. From this, the business person may monitor the health of and predicted failure of the device, make sure appropriate downtime is scheduled and increase the overall availability of a loop, area, plant, etc.

Figure 20:
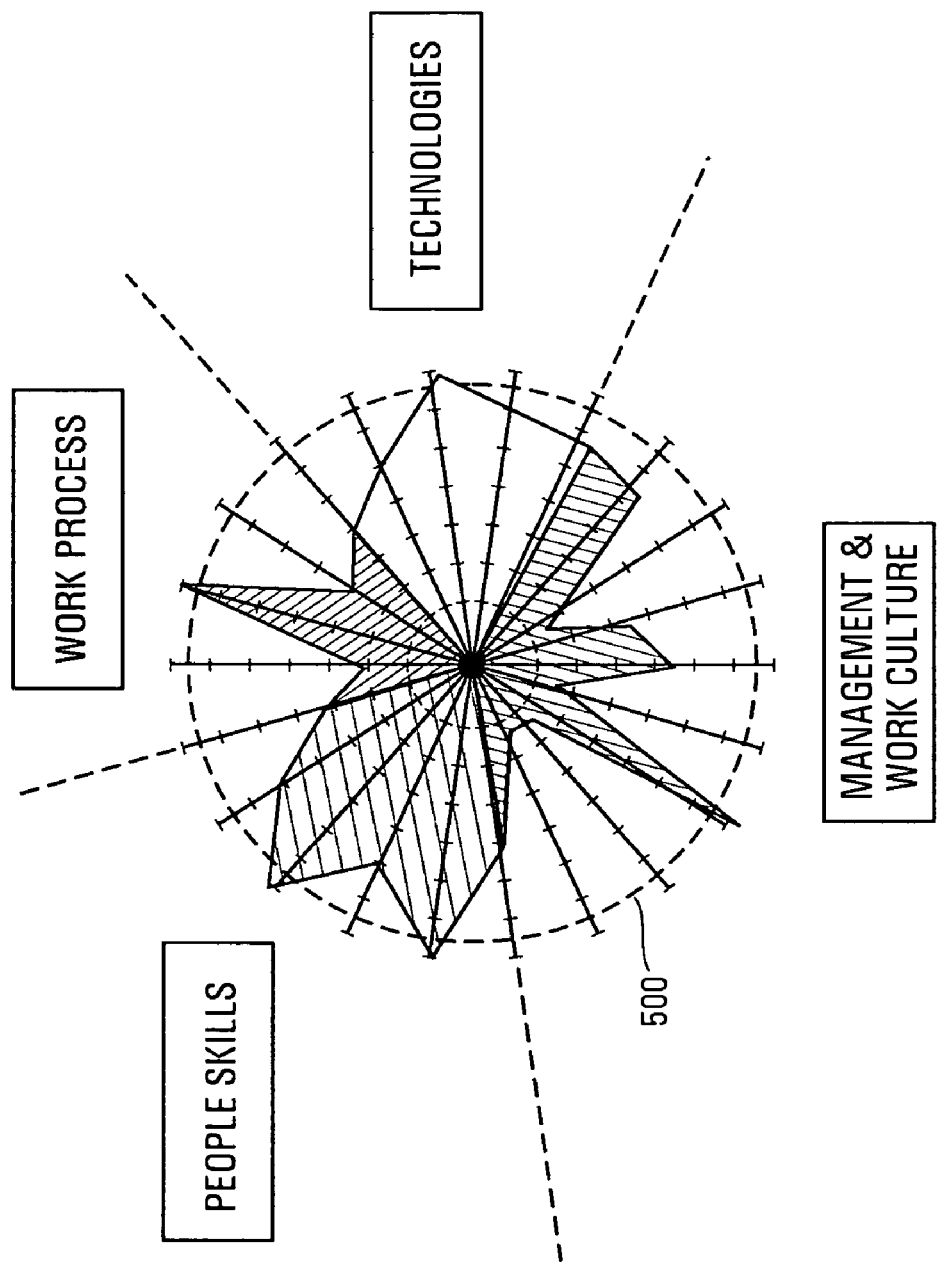
FIG. 20 is an exemplary graphical display that may be provided by a graphical user interface to enable a user to view consultancy, benchmarking and assessment information.

FIG. 20 is an exemplary depiction of a further alternative display that may be proved by the GUI to enable a user to view graphical representations of status information regarding consultancy, benchmarking and assessment. Examples of relevant variables that may be plotted include people skills, work process, technologies, and management and work culture. As above, each of these variable may link to further information and be replaced with various types of status information or data source as desired, just as the plot may relate to a different entity, data source, or type of status information as desired. For example, each leg on the plot may be changed to be associated with a different entity, where the entire plot relates to the health of each entity. Alternatively, the plot may relate to a particular data source, with each leg corresponding to a particular type of status information available from that data source. A variety of combinations and variations are possible with any of the reports discussed herein, as is understood by those of ordinary skill in the art. This particular style of graph may commonly be referred to as a "spider chart," as referenced above. As with FIGS. 16-19, the spider chart includes a plurality of legs, with a variable or type of status information associated with each leg. As the situation relating to a particular variable worsens, the corresponding leg of the spider chart may recede towards the center, and vice versa should the situation relating to the particular variable become better. A threshold value may be represented by a line 500, which may be set by the user and act as a benchmark for each variable. Each variable may then be assessed against the benchmark.

Various types of status information may be presented in the reports, as mentioned throughout this patent. The types of status information may include business information, operational information, maintenance information or any other type of information that may be used to create corresponding business reports, operational reports, maintenance reports, etc. However, any and all types of status information may be included in these various reports. For example, as mentioned above, different kinds of business information includes KPIs, economic analyses, plant yield, stock information, production planning, material resource planning, profit margins, capitol turnover rates, profitability, etc.

Examples of KPIs include, though are not limited, to the following: health, availability, downtime, utilization, reliability, age (lifespan), failure predication, and mean time between failure. A health index, as disclosed in U.S. patent application Ser. No. 10/085,439, referred to above, may relate to the health of a particular device, loop, unit, area, etc. and may further relate to the overall health of the plant. The health index may be provided by an asset management system by querying the necessary devices, loops, etc. The value of the health index may be analyzed and related to the overall priority associated with the entity. Health indices of various entities may be combined, and weighted as necessary, to provide health indices for higher level entities.

Availability may be determined based on failure information collected and compiled from the various entities. Availability of lower level entities will generally have an effect on the determined availability of higher level entities. Downtime may also be calculated based on process data and failure information to indicate the downtime of devices, loops, units, areas, etc. Utilization may also be based on process data. Utilization may be represented as an index value, as disclosed in U.S. patent application Ser. No. 10/085,439, referred to above. Reliability may be determined based on failure and health data that has been collected. Age (i.e., the lifespan of an entity) may be determined based on information received directly from the entity and/or determined by the asset management system. The expected or predicted lifespan of an entity may be reflective of its environment and use, and may further relate to the maintenance of the entity and related entities. Failure predictions, which may relate to the lifespan of an entity, may be determined based on statistical analyses taking into account the type of entity, manufacturer, model, etc. Failure predictions indicate the probability of failures over time and provide an indication of when assets should be replaced, or if preventative maintenance should be performed. Mean Time Between Failure (MTBF) is based on failure data captured from the assets and the asset management system. The time between such failures may be calculated and reported for individual assets, asset types and plant locations (e.g., units, areas, plants, etc.).

Other KPIs may include utilities, safety and environment, and waste. Utilities can represent a large part of the production costs. A report on utilities could show the cost of energy, how efficiently energy has been used and how energy use should be optimized. Safety and environment may represent costs due to hazardous environmental exposure, costs associated with tracking spurious device fault notifications, fugitive emissions and documentation. Reports including safety and environment information may track safety compliance issues and environmental incidents. Waste reflects the cost of reprocessing and disposal.

Economic analyses may also be reported and incorporate the above KPIs. For example, an economic analysis may include availability which indicates the percent of time a product is being produced, and is calculated by actual production time divided by the total available production time. A further economic analysis may be quality, which is a measurement of the actual amount of production that meets specifications divided by the total amount of production. By tracking the accuracy of measurements and asset performance, control setpoints may be optimized. Diagnostics may predict problems and reduce the amount of time that production is controlled based on bad data (i.e., downtime affects production control). Throughput is yet another economic analysis. Throughput indicates the actual production divided by capacity (e.g., what a plant is theoretically capable of producing). This information may be based on production information from the control system and the RTO+ real time optimization routine. Cost analyses may take into account factors such as downtime, cost vs. fixing, cost vs. running to failure, cost of downtime, cost of deviations, etc.

Failure reports may identify problem assets, problem asset types, problem units, etc. Problem assets, problem asset types and problem units are typically those assets, asset types or units, respectively, that perpetually fail or cause upsets in the production process. Furthermore, detailed help information may be made available on how to best manage the failure. This detailed help may provide suggested corrective measures or recommendations (e.g., recommended actions) that may be taken along with corresponding step-by-step instructions to guide the user or some other person in rectifying the problem diagnosed by the system, though the detailed help information may provide instructions regarding non-suggested measures. Additionally, failure reports may include predictions and analyses as to which entities are close to failing or will likely fail first, what effect such a failure will have on other entities (e.g., overall area or plant failure, impact on profitability, etc.) or on other aspects of the plant 10 (e.g., profitability, quality, etc.), failure history of a particular entity, failure mode, and underlying causes of failure. Predictive failure analyses may be created based on some or all of these variables. In turn, failure reports may include a failure defense plan by taking into account the above factors, prioritizing tasks, generating work orders, parts orders, service orders, etc. Operational information, maintenance history, equipment specifications and engineering analysis may contribute to the development of the failure predictions and analyses. In some cases, failure of an entity may be merely superficial of a greater underlying cause for failure. In order to provide the appropriate maintenance, a root cause failure analysis may be performed which may draw on the knowledge and experience of appropriate personnel that in turn may provide information for a report detailing the proper maintenance to be performed.

Prioritization relates to the evaluation of various entities and ranking those entities according to the criticality associated with each entity (i.e., criticality ranking). Prioritization may be performed at any scale or level within the plant, and may prioritize short term and long term goals. For instance, each area may be ranked according to its criticality to the plant 10, each unit within each area may be ranked according to both its criticality to its area and to the plant 10, each device may be ranked according to its criticality to its unit, its area and to the plant 10, etc. This may commonly be referred to as an operational criticality ranking when associated with devices and loops, while a system criticality ranking is often being associated with areas and units. A system criticality ranking may take into account such factors as operational costs, throughput, product quality, process availability, safety and environment. The operational and system criticality rankings may be combined to create an asset criticality ranking. Status information relating to the above-mentioned failure predictions along with reliability information may be used to create an asset failure probability factor, which in turn may be combined with the asset criticality ranking to create a maintenance priority index. The maintenance priority index expresses the relative urgency and level of demand placed on a particular entity if the entity is to perform successfully. Maintenance reports may then include task planning, task assignment, prioritization, work orders, parts orders, service orders, etc., and relate to any kind of maintenance such as preventative maintenance, predictive maintenance, proactive maintenance or corrective maintenance.

Prioritization may further relate to any aspect of the process plant 10, whether it is business related (e.g., which part of the plant is most critical to profitability), operations related (e.g., which device within a unit is most critical to effective performance), or maintenance related (e.g., which device needs the most immediate attention). A priority index, such as high, medium or low priority, may be used to signify the resulting prioritization results. Prioritization may also be weighted. For example, two devices may both be close to critical failure, though one device may only be used sporadically, whereas the other device is central to the operation of a loop or unit. The second device would be granted greater weight and therefore be ranked ahead of the first device for maintenance.

Entity-specific information may also be reported, and may relate to any entity including the process plant 10. This entity-specific information may include lists of lower-level entities that make up a higher level entity, active alerts, alarms, historical events, entity details, alert details, event details and dynamic links to related information. Entity-specific details further include identification, location, function, calibration, configuration, efficiency, specifications (expected, acceptable, actual, etc.), alignment, chemistry, balancing, quality, thermodynamics (flow, temperature, etc.), position, speed, chatter, manufacturer, manufacturing specifications, and tolerance levels. Other entity-specific details discussed above may also be included, such as priority, availability, reliability, lifespan, and use indices (performance, health, variability, utilization) as disclosed in U.S. patent application Ser. No. 10/085,439, referred to above. Much of this information may be analyzed and quantified to determine severity, urgency, priority, etc. as discussed above. Further types of entity-specific analyses and diagnostics include oil or lubricant analyses (e.g., wear, contamination), vibration analyses (e.g., defects, dynamic faults), thermography (e.g., hot spots, over/under temperature), ultrasonic analyses(e.g., abnormalities, operating faults), and visual analyses (abnormalities, unusual/improper).

Optimization information may be reported based on information gathered from optimizers and predictive models, such as the RTO+ optimizer discussed above, and may relate to any function within the process plant 10, including business, operations or maintenance functions. Monitoring, whether local or remote, may provide monitoring information to be used as a basis for further analyses and diagnostics or be viewed as raw data. Monitoring information may be gathered through E-fficiency™, discussed above, and include problem data, condition data, plant data, process data, device data and optimization data.

Operations reports may be based on much of the abovementioned status information, including OEEs, alarms, alerts, alert frequency, production analyses (e.g., production vs. capacity, production vs. scrap, overall productivity), products, earnings, failure implications, cost analyses, downtime, performance, efficiency, cost avoidance, predictive maintenance alerts and corresponding predictive maintenance, etc. As can be seen from the above, and as will be understood by those of ordinary skill in the art, no one particular type of status information is limited to a particular report or particular entity. Status information may be equally applicable to a business report as to an operations report and as to a maintenance report. Likewise, status information of a particular type may be applicable to any entity at any level whether the entity be a device, loop, unit, area or the process plant 10. Status information for lower level entities may therefore be aggregated at time to produce the same type of status information for a higher level entity. Other times, status information of various types may be brought together to provide a new type of status information for the same or a different entity.

While the asset optimization reporter 60, user interface routine 58 and associated GUIs and displays have been described as preferably being implemented in software, they may be implemented in hardware, firmware, etc., an may be implemented by any other processor associated with the process plant 10. Thus, the elements described herein may be implemented in a standard multi-purpose CPU or on specially designed software or firmware such as an application-specific integrated circuit (ASIC) or other hardwired device as desired. When implemented in software, the routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, while the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of reporting status information regarding an entity within a process plant comprising:

receiving status information of a first type, wherein the first type of status information reflects a condition having a first temporal consequence;

receiving status information of a second type, wherein the second type of status information reflects a condition having a second temporal consequence shorter than the first temporal consequence;

receiving status information of a third type, wherein the third type of status information reflects a condition having a third temporal consequence shorter than the first temporal consequence;

generating a report on a processor that includes the status information of the first, second and third types, wherein the report is indicative of the status of the entity; and displaying the report to a user, wherein the display of the report includes a polygonal representation indicative of the status of the entity, wherein the polygonal representation comprises three or more axes each pertaining to a different entity status category having a spectrum of values between a good status quality and a bad status quality and normalized relative to the other spectrums of values, each axis having a finite number of increments measured from a common origin relative to one end of the spectrum of values to an endpoint relative to the other end of the spectrum of values, wherein each endpoint is normalized to be equidistant from the origin as other endpoints of the other axes, wherein entity status values pertaining to each status category are proportionally assigned to a point on the respective axis and the point is linearly connected to a point of an entity status value of at least one other axis to define the polygonal representation intersecting the axes for a combined display of each of the plurality of categories, and wherein each type of status information pertains to a different one of the plurality of categories.

2. The method of claim 1, wherein one or more of the status information of the first type, the status information of the second type and the status information of the third type pertains to the status of the entity.

3. The method of claim 1, wherein the entity is a first entity, and one or more of the status information of the first type, the status information of the second type and the status information of the third type pertains to the status of a second entity.

4. The method of claim 1, wherein generating a report comprises generating a report based in part on a user profile and displaying the report comprises displaying the report based at least in part on the user profile.

5. The method of claim 4, wherein the display of the report comprises dynamic and static information, and displaying the report comprises displaying the dynamic information based on one or more user preferences within the user profile and displaying the static information regardless of the user preferences.

6. The method of claim 4, wherein the user profile comprises default parameters, and generating a report comprises generating a report based at least in part on the default parameters.

7. The method of claim 4, wherein the user profile comprises information about the user's responsibilities within the process plant, and generating a report comprises generating a report based at least in part on the user's responsibilities within the process plant.

8. The method of claim 4, wherein the user profile comprises user preferences, and generating a report comprises generating a report based at least in part on the user preferences.

9. The method of claim 8, wherein the user preferences include preferences regarding the type of status information indicated in the report, and generating a report comprises generating a report based at least in part on the user preferences regarding the type of status information.

10. The method of claim 8, wherein the user preferences comprise preferences regarding the representation of the status information in the report, and displaying the report comprises displaying the report based at least in part on the user preferences regarding the representation of the status information.

11. The method of claim 10, wherein the user preferences regarding the representation of the status information comprise preferences regarding at least one of the type of representation of the status information and the placement of the representation of the status information.

12. The method of claim 8, wherein the user preferences comprise preferences predefined by the user, and generating a report comprises generating a report based at least in part on the predefined preferences.

13. The method of claim 8, wherein the user preferences comprise default preferences based at least in part on predictions about the user, and generating a report comprises generating a report based at least in part on the predictions about the user.

14. The method of claim 8 further comprising adjusting the user preferences while displaying the report to a user, wherein displaying the report comprises displaying the report based on the adjusted user preferences.

15. The method of claim 1, wherein the entity includes a plurality of lower level entities, the method further comprising:
receiving status information pertaining to the status of each of the plurality of lower level entities;
wherein generating a report comprises generating a report based at least in part on the status information pertaining to the status of one or more of the lower level entities, and displaying the report comprises displaying a lower level representation of the status information pertaining to the status of the one or more lower level entities.

16. The method of claim 15, wherein displaying a lower level representation comprises displaying a lower level representation in response to at least one of a user action and the user profile.

17. The method of claim 15, wherein the status information pertaining to the status of one or more of the lower level entities comprises at least one of the status information of the first type, status information of the second type and status information of the third type.

18. The method of claim 1, wherein the entity is a first entity and the report is a first report, the method further comprising:
receiving status information pertaining to the status of a second entity;
generating a second report based at least in part on the status information pertaining to the second entity; and
displaying the second report to the user, wherein the display of the second report includes a representation of the status information pertaining to the status of the second entity.

19. The method of claim 18, wherein the status information pertaining to the status of the second entity is of the same type as one of the status information of the first type, the second type or the third type.

20. The method of claim 18, wherein the status information pertaining to the status of the second entity has an impact on one or more of the status information of the first type, the second type and the third type.

21. The method of claim 18, wherein generating a second report comprises generating a second report based at least in part on a user profile, and wherein displaying the second report to the user comprises displaying the second report to the user based at least in part on the user profile.

22. The method of claim 21, wherein the status information comprises dynamic information and the status information pertaining to the status of the second entity comprises static information, wherein displaying the first and second reports comprises displaying the First report based on one or more user preferences contained within the user profile and displaying the second report regardless of the user preferences.

23. The method of claim 21, wherein the user profile comprises user preferences regarding the first and second entities, and generating a report comprises generating a report pertaining to the status of the preferred entity and displaying the report comprises displaying the report based at least in part on the status information of the preferred entity.

24. The method of claim 1, wherein the status information of the first type, the second type and the third type each pertain to one or more of business information, operational information and maintenance information.

25. The method of claim 1, wherein the status information of the first type, the second type and the third type each pertain to one or more of: entity availability, entity health, entity downtime, entity utilization, entity reliability, entity performance, entity age, entity failure, entity prioritization, entity instructions, entity history, entity location, entity description, entity type, entity specifications, entity alignment, entity function, entity details, entity identification, entity manufacturer, entity alerts, entity optimization, entity alarms, entity configuration, entity calibration, entity position, entity speed, entity tolerances, entity chatter, key performance indicators, use indices, work orders, service orders, parts orders, predictions, models, waste, safety, environment, utilities, quality, throughput, an economic analysis, an impact analysis, a production analysis, a cost analysis, a vibration analysis, a thermography analysis, a lubricant analysis, a chemistry analysis, a balance analysis, an ultrasonic analysis, monitoring information, operating equipment effectiveness, efficiency, task planning, task assignment, a corrective measure, help information, recommendations, instructions, diagnostic information, event severity, and event urgency.

26. The method of claim 1, wherein at least one of the first, second and third types of status information comprise status information generated based on status information of a plurality of types.

27. The method of claim 1, further comprising:
receiving status information of a fourth type from a fourth data source wherein the fourth type of status information reflects a condition having a fourth temporal consequence shorter than the third term consequence,
wherein the polygonal representation comprises four or more axes each pertaining to a different entity status category having a spectrum of values between a good status quality and a bad status quality and normalized relative to the other spectrums of values.

28. The method of claim 27, wherein the status information of the first type comprises design and quality status information, the status information of the second type comprises an operating condition information, the status information of the third type comprises a measure of entity health, and the status information of the fourth type comprises production status information.

29. The method of claim 1, wherein the status information of the first type comprises design and quality status information, the status information of the second type comprises operating condition information, and the status information of the third type comprises a measure of entity health.

30. The method of claim 29, wherein the status information of the first type is associated with a fluid chemistry category, the status information of the second type is associated with a fluid contamination category and the status information of the third type is associated with an equipment wear category.

31. A method of reporting status information regarding an entity within a process plant, wherein the process plant includes a plurality of lower level entities and wherein the plurality of lower entities comprise a higher level entity, the method comprising:
receiving status information pertaining to the status of each of the plurality of lower level entities;

receiving status information of a plurality of types, the status information pertaining to the status of the higher level entity and each type of status information reflecting a condition having a different temporal consequence;

generating a higher level report on a processor based at least in part on the status information pertaining to the status of the higher level entity and based further in part on a user profile;

displaying the higher level report to a user based at least in part on the user profile, wherein the display of the report includes a polygonal representation of the status information pertaining to the status of the higher level entity, wherein the polygonal representation comprises three or more axes each pertaining to a different entity status category having a spectrum of values between a good status quality and a bad status quality and normalized relative to the other spectrums of values, each axis having a finite number of increments measured from a common origin relative to one end of the spectrum of values to an endpoint relative to the other end of the spectrum of values, wherein each endpoint is normalized to be equidistant from the origin as other endpoints of the other axes, wherein entity status values pertaining to each status category are proportionally assigned to a point on the respective axis and the point is linearly connected to a point of an entity status value of at least one other axis to define the polygonal representation intersecting the axes for a combined display of each of the plurality of categories, wherein each type of status information pertains to a different one of the plurality of categories;

wherein the status information comprises status information of a first, second, third and fourth type each reflecting a condition having a different temporal consequence, and wherein the plurality of categories of the polygonal representation are arranged according to successively decreasing or increasing temporal consequences of the status information pertaining to the categories.

32. The method of claim 31 further comprising:

generating a lower level report pertaining to the status of at least one of the plurality of lower level entities; and displaying the lower level report to the user, wherein the display of the lower level report includes a representation of the status information pertaining to the status of the lower level entity.

33. The method of claim 32, wherein displaying the lower level report comprises displaying the lower level report in response to a user action from the display of the higher level entity.

34. The method of claim 32, wherein displaying the higher level report comprises displaying the higher level report in response to a user action from the display of the lower level entity.

35. The method of claim 32, wherein displaying the lower level report comprises displaying the lower level report concurrently with displaying the higher level report.

36. The method of claim 31, wherein the report comprises status information pertaining to one or more of business information, operational information and maintenance information.

37. The method of claim 31, wherein the report further comprises status information pertaining to one or more of: entity availability, entity health, entity downtime, entity utilization, entity reliability, entity performance, entity age, entity failure, entity prioritization, entity instructions, entity history, entity location, entity description, entity type, entity specifications, entity alignment, entity function, entity details, entity identification, entity manufacturer, entity alerts, entity optimization, entity alarms, entity configuration, entity calibration, entity position, entity speed, entity tolerances, entity chatter, key performance indicators, use indices, work orders, service orders, parts orders, predictions, models, waste, safety, environment, utilities, quality, throughput, an economic analysis, an impact analysis, a production analysis, a cost analysis, a vibration analysis, a thermography analysis, a lubricant analysis, a chemistry analysis, a balance analysis, an ultrasonic analysis, monitoring information, operating equipment effectiveness, efficiency, task planning, task assignment, a corrective measure, help information, recommendations, instructions, diagnostic information, event severity, and event urgency.

38. A system for reporting status information for a process plant having a plurality of entities, the system comprising:

a computer readable memory;

a display;

a routine stored on the computer readable memory and adapted to be executed by a processor which stores user profiles;

a routine stored on the computer readable memory and adapted to be executed by the processor which receives status information of a plurality of types, the status information pertaining to each of the plurality of entities and each type of status information reflecting a condition having a different temporal consequence;

a routine stored on the computer readable memory and adapted to be executed by the processor which generates a report based at least in part on the status information of one or more of the plurality of entities and based further in part on a user profile, wherein the report is indicative of the status of the one or more entities;

a routine stored on the computer readable memory and adapted to be executed by the processor which displays the report to the user in accordance with the user profile, wherein the display of the report includes a polygonal representation of the status information pertaining to the status of the one or more entities, wherein the polygonal representation comprises three or more axes each pertaining to a different entity status category having a spectrum of values between a good status quality and a bad status quality and normalized relative to the other spectrums of values, each axis having a finite number of increments measured from a common origin relative to one end of the spectrum of values to an endpoint relative to the other end of the spectrum of values, wherein each endpoint is normalized to be equidistant from the origin as other endpoints of the other axes, wherein entity status values pertaining to each status category are proportionally assigned to a point on the respective axis and the point is linearly connected to a point of an entity status value of at least one other axis to define the polygonal representation intersecting the axes for a combined display of each of the plurality of categories, wherein each type of status information pertains to a different one of the plurality of categories;

wherein the status information comprises status information of a first, second, third and fourth type each reflecting a condition having a different temporal consequence, and wherein the plurality of categories of the polygonal representation are arranged according to successively decreasing or increasing temporal consequences of the status information pertaining to the categories.

39. The system of claim 38 further comprising a routine stored on the computer readable memory and adapted to be executed by the processor which stores a plurality of user-selectable representations, wherein the polygonal representation of the status information is selected from among a plurality of user-selectable representations in accordance with the user profile.

40. The system of claim 39, wherein the plurality of user-selectable representations comprise at least one of the polygonal representation, an alphanumeric representation and a graphical representation.

41. The system of claim 38, wherein the plurality of entities are lower level entities and the process plant further includes a higher level entity that includes two or more of the lower level entities, the system further comprising:
 a routine stored on the computer readable memory and adapted to be executed by the processor which receives status information pertaining to the status of the higher level entity;
 a routine stored on the computer readable memory and adapted to be executed by the processor which generates a higher level report pertaining to the status of the higher level entity; and
 a routine stored on the computer readable memory and adapted to be executed by the processor which displays the higher level report to the user, wherein the display of the higher level report includes a representation of the status information pertaining to the status of the higher level entity.

42. The system of claim 41, wherein the higher level report is generated in response to a user request from the display of the status information of the one or more lower level entities.

43. The system of claim 41, wherein the higher level report is generated in response to a user preference contained in the user profile.

44. The system of claim 41, wherein the representation of the status information pertaining to the higher level entity is displayed concurrently with the polygonal representation of the status information pertaining to one or more of the lower level entities.

45. The system of claim 41, further comprising a routine stored on the computer readable memory and adapted to be executed by the processor which switches between displaying the representation of the status information pertaining to the higher level entity and displaying the polygonal representation of the status information of one or more of the plurality of entities in response to a user action.

46. The system of claim 41, wherein the higher level entity is the process plant.

47. The system of claim 38 further comprising:
 a routine stored on the computer readable memory and adapted to be executed by the processor which alters the polygonal representation of the status information in response to a user request; and
 a routine stored on the computer readable memory and adapted to be executed by the processor which displays the report to the user in accordance with a user profile, wherein the display of the report includes the altered representation of the status information.

48. The system of claim 47 further comprising a routine stored on the computer readable memory and adapted to be executed by the processor which updates the user profile in response to altering the polygonal representation of the status information.

49. The system of claim 38, wherein the report comprises status information pertaining to one or more of business information, operational information and maintenance information.

50. The system of claim 38, wherein the report further comprises status information pertaining to one or more of: entity availability, entity health, entity downtime, entity utilization, entity reliability, entity performance, entity age, entity failure, entity prioritization, entity instructions, entity history, entity location, entity description, entity type, entity specifications, entity alignment, entity function, entity details, entity identification, entity manufacturer, entity alerts, entity optimization, entity alarms, entity configuration, entity calibration, entity position, entity speed, entity tolerances, entity chatter, key performance indicators, use indices, work orders, service orders, parts orders, predictions, models, waste, safety, environment, utilities, quality, throughput, an economic analysis, an impact analysis, a production analysis, a cost analysis, a vibration analysis, a thermography analysis, a lubricant analysis, a chemistry analysis, a balance analysis, an ultrasonic analysis, monitoring information, operating equipment effectiveness, efficiency, task planning, task assignment, a corrective measure, help information, recommendations, instructions, diagnostic information, event severity, and event urgency.

51. A system for displaying status information regarding an entity within a process plant having a plurality of entities, the system comprising:
 a processor;
 a display;
 a routine adapted to be executed by the processor which receives status information pertaining to the status of the entity;
 a routine adapted to be executed by the processor which generates a report based at least in part on the status information;
 a routine adapted to be executed by the processor which displays a polygonal representation of categories comprising: asset management information pertaining to the entity, monitoring information pertaining to the entity, maintenance information pertaining to the entity and performance information pertaining to the entity, each category corresponding to a condition having a different temporal consequence, wherein the polygonal representation comprises four or more axes each pertaining to a different entity status category having a spectrum of values between a good status quality and a bad status quality and normalized relative to the other spectrums of values, each axis having a finite number of increments measured from a common origin relative to one end of the spectrum of values to an endpoint relative to the other end of the spectrum of values, wherein each endpoint is normalized to be equidistant from the origin as other endpoints of the other axes, wherein entity status values pertaining to each status category are proportionally assigned to a point on the respective axis and the point is linearly connected to a point of an entity status value of at least one other axis to define the polygonal representation intersecting the axes for a combined display of each of the plurality of categories, wherein different types of status information pertain to a different one of the plurality of categories;
 wherein the status information comprises status information of a first, second, third and fourth type each reflecting a condition having a different temporal consequence, and
 wherein the plurality of categories of the polygonal representation are arranged according to successively decreasing or increasing temporal consequences of the status information pertaining to the categories.

52. The system of claim 51, further comprising a routine adapted to be executed by the processor which displays a representation of one or more of: history information pertaining to the entity, alert information pertaining to the entity, failure information pertaining to the entity, calibration information pertaining to the entity, operating equipment effectiveness information pertaining to the entity, event information pertaining to the entity and key performance indicators pertaining to the entity.

53. The system of claim 51, wherein the entity comprises a two or more lower level entities and wherein the system further comprises a routine adapted to be executed by the processor which displays a representation of the two or more lower level entities.

54. The system of claim 51, further comprising a routine adapted to be executed by the processor which displays a representation of a use index pertaining to the entity.

55. The system of claim 51, further comprising a routine adapted to be executed by the processor which displays a representation of one or more data sources wherein the one or more data sources provide the status information pertaining to the status of the entity.

56. The method of claim 51, wherein the status information of the first type comprises design and quality status information, the status information of the second type comprises an operating condition information, the status information of the third type comprises a measure of entity health, and the status information of the fourth type comprises production status information.

57. A method of reporting status information regarding an entity within a process plant comprising:
receiving status information of a first type, wherein the first type of status information reflects a condition having a first temporal consequence;
receiving status information of a second type, wherein the second type of status information reflects a condition having a second temporal consequence shorter than the first temporal consequence;
categorizing the status information of the first type into a first status category;
categorizing the status information of the second type into a second status category;
generating a report on a processor based at least in part on the status information of the first and second type; and
displaying the report to a user, wherein the display of the report includes a polygonal representation of the first and second status categories, a representation of the status information of the first type displayed proximate the first status category and a representation of the status information of the second type displayed proximate the second status category, wherein the polygonal representation comprises three or more axes each pertaining to a different entity status category having a spectrum of values between a good status quality and a bad status quality and normalized relative to the other spectrums of values, each axis having a finite number of increments measured from a common origin relative to one end of the spectrum of values to an endpoint relative to the other end of the spectrum of values, wherein each endpoint is normalized to be equidistant from the origin as other endpoints of the other axes, wherein entity status values pertaining to each status category are proportionally assigned to a point on the respective axis and the point is linearly connected to a point of an entity status value of at least one other axis to define the polygonal representation intersecting the axes for a combined display of each of the plurality of categories, wherein each type of status information pertains to a different one of the plurality of categories.

58. The method of claim 57 further comprising:
determining a first severity level for the first status category based at least in part on the status information of the first type; and
determining a second severity level for the second status category based at least in part on the status information of the second type,
wherein the display of the report includes a representation of the first and second severity levels.

59. The method of claim 58, wherein the representation of the first and second severity levels each include multiple levels.

60. The method of claim 58, wherein the status information of the first type is associated with a third severity level and the status information of the second type is associated with a fourth severity level, and wherein the determining the first severity level comprises determining the first severity level based at least in part on the third severity level and determining the second severity level comprises determining the second severity level based at least in part on the fourth severity level.

61. The method of claim 58, wherein the status information of the first type is associated with a third severity level, the method further comprising:
receiving status information of a third type wherein the status information of the third type is associated with a fourth severity level; and
categorizing the status information of the third type into the first status category,
wherein determining the first severity level comprises determining the first severity level based on the greater severity from among the third severity level and the fourth severity level.

62. The method of claim 57, wherein receiving status information of the first type comprises receiving status information from the entity.

63. The method of claim 57, wherein one or more of the status information of the first type and the status information of the second type pertains to the status of the entity.

64. The method of claim 57, wherein the display of the report comprises a plurality of status categories including the first and second status categories, and wherein the plurality of status categories comprise a business category, an operational category and a maintenance category.

65. The method of claim 57, wherein the display of the report comprises a plurality of status categories including the first and second status categories, and wherein the plurality of status categories comprise a failure category, an operational category and a quality category.

66. The method of claim 57, wherein the display of the report comprises a plurality of status categories including the first and second status categories, and wherein the plurality of status categories comprise a quality category, an operation category and a performance category.

67. The method of claim 57, wherein the display of the report comprises a plurality of status categories including the first and second status categories, and wherein the plurality of status categories comprise at least one of a decision-making category and a process control category.

68. The method of claim 57, wherein the status information of the first type pertains to one or more of: entity availability, entity health, entity downtime, entity utilization, entity reliability, entity performance, entity age, entity failure, entity prioritization, entity instructions, entity history, entity location, entity description, entity type, entity specifications, entity alignment, entity function, entity details, entity identification, entity manufacturer, entity alerts, entity optimization, entity alarms, entity configuration, entity calibration, entity position, entity speed, entity tolerances, entity chatter, key performance indicators, use indices, work orders, service orders, parts orders, predictions, models, waste, safety, environment, utilities, quality, throughput, an economic analysis, an impact analysis, a production analysis, a cost analysis, a vibration analysis, a thermography analysis, a lubricant analysis, a chemistry analysis, a balance analysis, an ultrasonic analysis, monitoring information, operating equipment effectiveness, efficiency, task planning, task assignment, a corrective measure, help information, recommendations, instructions, diagnostic information, event severity, and event urgency.

* * * * *

UNITED STATES PATENT AND TRADEMARK OFFICE
CERTIFICATE OF CORRECTION

| | | |
|---|---|---|
| PATENT NO. | : 7,634,384 B2 | Page 1 of 1 |
| APPLICATION NO. | : 10/390818 | |
| DATED | : December 15, 2009 | |
| INVENTOR(S) | : Evren Eryurek et al. | |

It is certified that error appears in the above-identified patent and that said Letters Patent is hereby corrected as shown below:

At Column 15, line 29, "includes" should be -- include --.

At Column 24, line 59, "are" should be -- is --.

At Column 25, line 50, "variable" should be -- variables --.

Claim 22
At Column 31, line 62, "First" should be -- first --.

Signed and Sealed this
Twenty-first Day of June, 2011

David J. Kappos
*Director of the United States Patent and Trademark Office*